US012683788B2

(12) United States Patent
Sarkar et al.

(10) Patent No.: US 12,683,788 B2
(45) Date of Patent: Jul. 14, 2026

(54) ROBUST, EFFICIENT, AND COMPLETE PROCESS FLOW IMPLEMENTATION OF AN EXTENDED VERSION OF FRACTIONAL NON-FUNGIBLE TOKENS IN A BLOCKCHAIN PLATFORM

(71) Applicant: Oracle International Corporation, Redwood Shores, CA (US)

(72) Inventors: Gourav Sarkar, Bangalore (IN); Paritosh Das, Bangalore (IN); Todd J. Little, Lafayette, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/780,305

(22) Filed: Jul. 22, 2024

(65) Prior Publication Data

US 2026/0025272 A1     Jan. 22, 2026

(51) Int. Cl.
*H04L 9/32* (2006.01)
(52) U.S. Cl.
CPC .................................. *H04L 9/3213* (2013.01)
(58) Field of Classification Search
CPC ..................................................... H04L 9/3213
See application file for complete search history.

(56) References Cited

U.S. PATENT DOCUMENTS

| | | | | |
|---|---|---|---|---|
| 11,367,060 B1 * | 6/2022 | Barbashin | .......... | H04N 21/2743 |
| 12,321,924 B1 * | 6/2025 | Kurani | .................. | G06Q 40/04 |
| 2020/0038761 A1 * | 2/2020 | Packin | .................. | A63F 13/828 |
| 2022/0027902 A1 * | 1/2022 | Vandenberg | ......... | G06Q 20/223 |
| 2022/0270087 A1 * | 8/2022 | Kim | .......................... | H04L 9/50 |
| 2022/0358186 A1 * | 11/2022 | Deuel | ...................... | H04L 9/50 |
| 2023/0073859 A1 * | 3/2023 | Matthews | .......... | G06Q 30/0641 |
| 2023/0092012 A1 * | 3/2023 | Matthews | .......... | G06Q 20/0658 |
| 2023/0267450 A1 * | 8/2023 | Bathen | ................. | G06Q 20/389 |
| | | | | 705/66 |
| 2023/0385815 A1 * | 11/2023 | Jakobsson | .............. | G06Q 20/36 |
| 2024/0005320 A1 * | 1/2024 | Pardo | ......................... | H04L 9/50 |
| 2024/0005409 A1 * | 1/2024 | Doney | .............. | G06Q 20/3678 |
| 2024/0169347 A1 * | 5/2024 | Bidkar | ...................... | G06N 3/08 |
| 2024/0177145 A1 * | 5/2024 | Miele | ...................... | G06Q 30/01 |
| 2024/0265362 A1 * | 8/2024 | Pedroso | ................. | G06Q 40/04 |
| 2024/0403953 A1 * | 12/2024 | Mohite | .................. | G06Q 50/02 |
| 2024/0403957 A1 * | 12/2024 | Boneta | .................. | H04L 9/0643 |
| 2025/0007721 A1 | 1/2025 | Little et al. | | |

(Continued)

OTHER PUBLICATIONS

Radomski et al., "ERC-1155: Multi Token Standard", available: https://eips.ethereum.org/EIPS/eip-1155.

(Continued)

*Primary Examiner* — Darren B Schwartz
(74) *Attorney, Agent, or Firm* — Hickman Becker Bingham Ledesma LLP; Stephen R. Tkacs

(57) ABSTRACT

A blockchain application builder generates a fractional NFT application for managing a fractional NFT in a blockchain platform based on a specification data structure. The specification data structure specifies a set of token properties and a set of token behaviors for a fractional NFT. The set of token properties includes a number of shares of the fractional NFT that can be owned by users of the blockchain platform. The fractional NFT application is deployed in the blockchain platform to manage a lifecycle of the fractional NFT.

20 Claims, 33 Drawing Sheets

(56)          References Cited

U.S. PATENT DOCUMENTS

| | | | |
|---|---|---|---|
| 2025/0069052 A1* | 2/2025 | Richards, IV | G06Q 20/02 |
| 2025/0139206 A1* | 5/2025 | Mathur | G06V 40/20 |
| 2025/0225489 A1* | 7/2025 | Kurani | G06Q 20/405 |
| 2025/0225494 A1* | 7/2025 | Ghosh | G06Q 20/367 |
| 2025/0274280 A1* | 8/2025 | Kurani | H04L 9/088 |

OTHER PUBLICATIONS

"Token Taxonomy Framework (TTF)", available: https://interwork.org/frameworks/token-taxonomy-framework/.

* cited by examiner

```
Specification File for Fractional  NFT
assets:
 -name: RealEstate
  type: token
  standard: erc1155+
  anatomy:
   type: nonfungible
   unit: fractional
  behavior:
   -divisible:
    decimal: 2
   -mintable:
    max_mint_quantity: 100
   -transferable
   -burnable
   -roles:
    minter_role_name: minter
    burner_role_name: burner
  properties:
   -name: price
    type: number
   -name: on_sale_flag
    type: Boolean
  metadata:
   -name: deed_name
    type: string
    mandatory: true
   -name: description
    type: string
   -name: address
    type: string
   -name: deed_agreement
    type: string
    mandatory: true
  customMethods:
   -executeQuery
```

FIG. 7

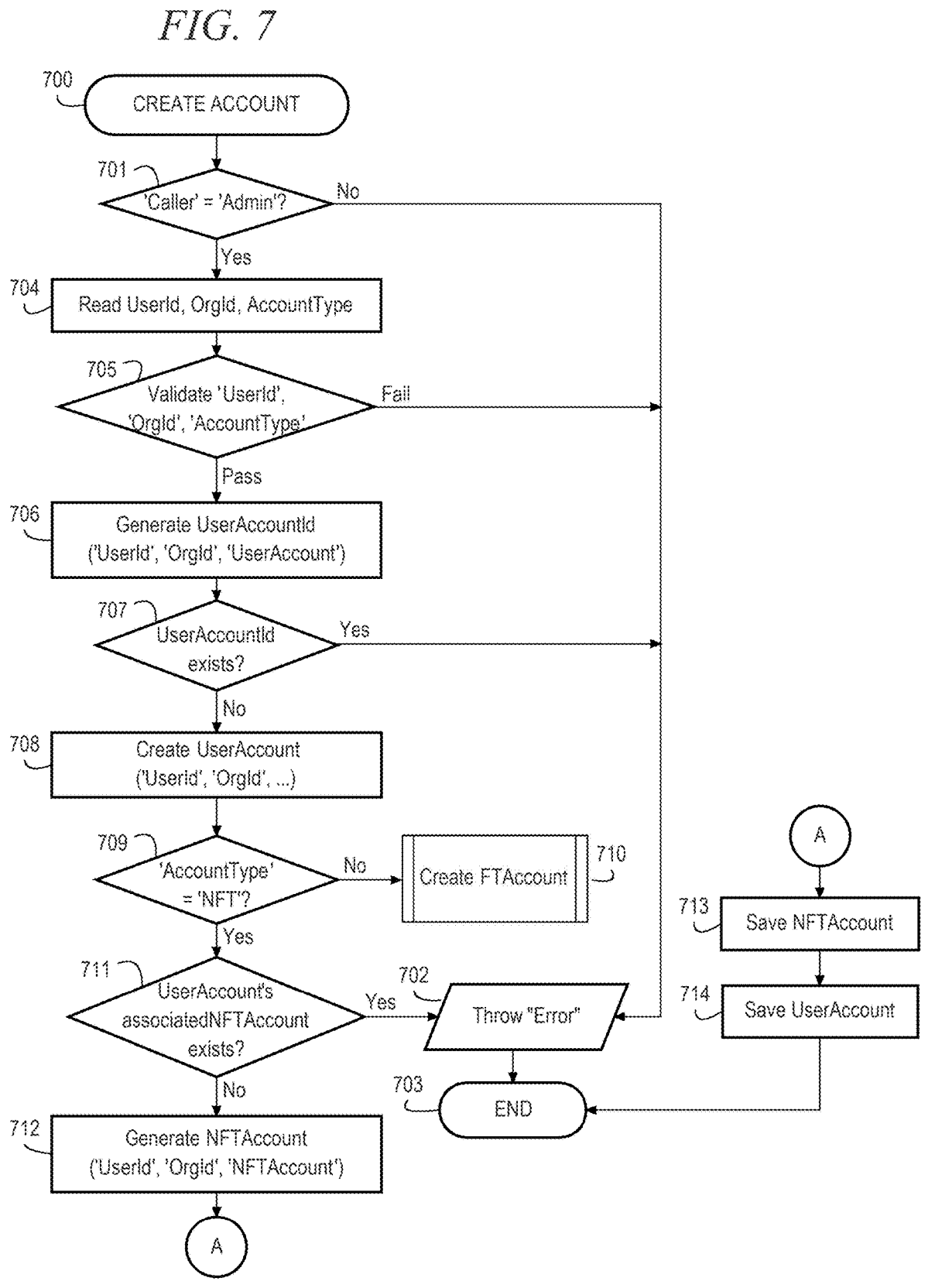

700 — CREATE ACCOUNT

701 — 'Caller' = 'Admin'? — No

Yes

704 — Read UserId, OrgId, AccountType

705 — Validate 'UserId', 'OrgId', 'AccountType' — Fail

Pass

706 — Generate UserAccountId ('UserId', 'OrgId', 'UserAccount')

707 — UserAccountId exists? — Yes

No

708 — Create UserAccount ('UserId', 'OrgId', ...)

709 — 'AccountType' = 'NFT'? — No → Create FTAccount — 710

Yes

711 — UserAccount's associatedNFTAccount exists? — Yes → 702 Throw "Error"

No

703 — END

712 — Generate NFTAccount ('UserId', 'OrgId', 'NFTAccount')

A

A

713 — Save NFTAccount

714 — Save UserAccount

*FIG. 8*

| UserAccount | |
|---|---|
| Key | ● accountId |
| | ● assetType |
| | ● userId |
| | ● orgId |
| | ● totalAccounts |
| | ● totalFtAccounts |
| | ● associatedFtAccounts |
| | ● associatedNftAccount |

*FIG. 9*

| NFTAccount | |
|---|---|
| Key | ● accountId |
| | ● assetType |
| | ● userId |
| | ● orgId |
| | ● tokenType |
| | ● noOfNfts |
| | ● bapAccountVersion |

*FIG. 11*

| NonFungible Token | |
|---|---|
| Key | ● tokenId |
| | ● assetType |
| | ● tokenId |
| | ● tokenName |
| | ● tokenDesc |
| | ● tokenStandard |
| | ● tokenType |
| | ● tokenUnit |
| | ● behaviors |
| | ● roles |
| | ● mintable |
| | ● divisble |
| | ● createdBy |
| | ● creationDate |
| | ● quantity |
| | ● isBurned |
| | ● tokenUri |
| EmbeddedKey | ● deedName |
| | ● deedAgreement |
| | ● address |
| | ● description |
| | ● price |
| | ● onSaleFlag |

*FIG. 12*

| NftMetadata | |
|---|---|
| Key | ● metadataId |
| | ● assetType |
| | ● metadataId |
| | ● tokenId |
| | ● tokenName |
| | ● isInstantiated |

*FIG. 13*

| NftClass | |
|---|---|
| Key | ● oerc1155~<tokenName> |
| | ● assetType |
| | ● tokenName |
| | ● tokenSupply |
| | ● totalMintedAmount |

*FIG. 14*

| Owners | |
|---|---|
| CompositeKey | ● tokenId~accountId<tokenId><accountId> |

*FIG. 15*

| FungibleNonFungible Token | |
|---|---|
| Key | ● tokenId |
| | ● assetType |
| | ● tokenId |
| | ● tokenName |
| | ● tokenDesc |
| | ● tokenStandard |
| | ● tokenType |
| | ● tokenUnit |
| | ● tokenForm |
| | ● mintable |
| ForeignKey | ● parentFractionalNft |

*FIG. 16*

| FtAccount | |
|---|---|
| Key | ● accountId |
| | ● assetType |
| | ● userId |
| | ● orgId |
| | ● tokenType |
| | ● tokenId |
| | ● tokenName |
| | ● balance |
| | ● accountCategory |

*FIG. 17*

| Key | oaccount~95be539b4e1e41... |
|---|---|
| Value | {<br>    "assetType": "ouaccount",<br>    "accountId": "ouaccount~95be539b4e1e41...",<br>    "userId": "sam",<br>    "orgId": "Org1MSP",<br>    "totalAccounts": 1,<br>    "totalFtAccounts": 0,<br>    "associatedFtAccounts": [],<br>    "associatedNftAccounts": "ouaccount~42e89f4c72dfde..."<br>} |

*FIG. 18*

| Key | oaccount~42e89f4c72dfde... |
|---|---|
| Value | `{`<br>   `"assetType": "oaccount",`<br>   `"accountId": "oaccount~42e89f4c72dfde...",`<br>   `"userId": "sam",`<br>   `"orgId": "Org1MSP",`<br>   `"tokenType": "nonfungible",`<br>   `"noOfNfts"": 1`<br>`}` |

*FIG. 19*

| Transaction | |
|---|---|
| Key | ● transactionId |
| | ● assetType<br>● transactionId<br>● tokenId<br>● fungibleTokenId<br>● fromAccountId<br>● fromFungibleAccountId<br>● toFungibleAccountId<br>● triggeredByUserAccountId<br>● amount<br>● transactionType<br>● timestamp |

FIG. 21

| Key | oaccount~d722e98f4cjddf20 ... |
|-----|-------------------------------|
| Value | ```<br>{<br>    "assetType": "oaccount",<br>    "accountId": "oaccount~d722e98f4cjddf20 ...",<br>    "userId": "sam",<br>    "orgId": "Org1MSP",<br>    "tokenType": "fungible",<br>    "tokenId": "real_onfft",<br>    "tokenname": "realestate",<br>    "balance": 3,<br>    "accountCategory": "internal"<br>}<br>``` |

FIG. 22

| Key | oaccount~ae73e89f4uin2dfdfq ... |
|-----|----------------------------------|
| Value | ```<br>{<br>    "assetType": "oaccount",<br>    "accountId": "oaccount~ae73e89f4uin2dfdfq ...",<br>    "userId": "tom",<br>    "orgId": "Org1MSP",<br>    "tokenType": "nonfungible",<br>    "NoOfNfts": 1<br>}<br>``` |

*FIG. 23*

| Key | oaccount~dsjk7832bjs32ds . . . |
|---|---|
| Value | ```
{
    "assetType": "oaccount",
    "accountId": "oaccount~dsjk7832bjs32ds . . .",
    "userId": "tom",
    "orgId": "Org1MSP",
    "tokenType": "fungible",
    "tokenId": "real_onfft",
    "tokenname": "realestate",
    "balance": 2,
    "accountCategory": "internal"
}
``` |

*FIG. 24*

| Key | tokenId~accountIdreal~oaccount~ae73e89f4uin2dfdfq . . . |
|---|---|

FIG. 25A

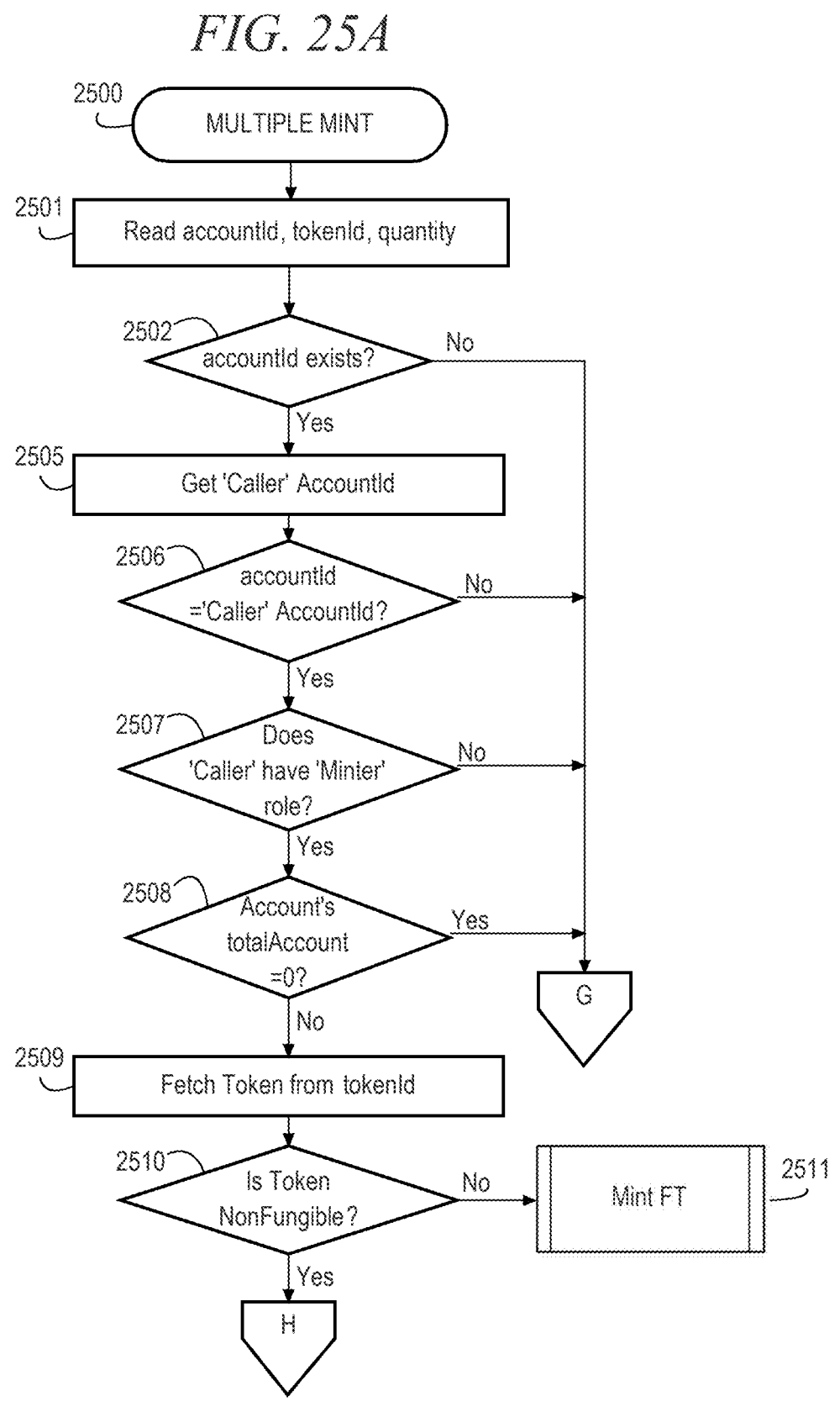

2500 — MULTIPLE MINT

2501 — Read accountId, tokenId, quantity

2502 — accountId exists? — No

Yes

2505 — Get 'Caller' AccountId

2506 — accountId ='Caller' AccountId? — No

Yes

2507 — Does 'Caller' have 'Minter' role? — No

Yes

2508 — Account's totalAccount =0? — Yes

No

G

2509 — Fetch Token from tokenId

2510 — Is Token NonFungible? — No — Mint FT — 2511

Yes

| Key | oaccount~d722e98f4cjddf20... |
|---|---|
| Value | ```{     "assetType": "oaccount",     "accountId": "oaccount~d722e98f4cjddf20...",     "userId": "sam",     "orgId": "Org1MSP",     "tokenType": "fungible",     "tokenId": "real_onfft",     "balance": 4,     "accountCategory": "internal" }``` |

FIG. 27

| Key | real |
|---|---|
| Value | ```{     "tokenMetadata": {       "deedName": "deed_101",       "deedAgreement": "agreement",       "address": "101 Hope Street ",     },     "assetType": "otoken",     "tokenId": "real",     "tokenName": "realestate",     "tokenStandard": "erc1155+",     ...     "quantity": 7,     "createdBy": "oaccount~d722e98f4cjddf20...",     "creationDate": "2023-08-21T12:15:39.000Z",     "isBurned": false,     "tokenUri": "http://...",     "price": 500 }``` |

FIG. 29

| Key | oaccount~dsjk7832bjs32ds ... |
|-----|------------------------------|
| Value | ```{
    "assetType": "oaccount",
    "accountId": "oaccount~dsjk7832bjs32ds ...",
    "userId": "tom",
    "orgId": "Org1MSP",
    "tokenType": "fungible",
    "tokenId": "real_onfft",
    "tokenName": "realestate",
    "balance": 0,
    "accountCategory": "internal"
}``` |

FIG. 30

| Key | oaccount~ae73e89f4uin2dfdfq ... |
|-----|---------------------------------|
| Value | ```{
    "assetType": "oaccount",
    "accountId": "oaccount~ae73e89f4uin2dfdfq ...",
    "userId": "tom",
    "orgId": "Org1MSP",
    "tokenType": "nonfungible",
    "noOfNfts": 0
}``` |

FIG. 31

| Key | real |
|-----|------|
| Value | <pre>{<br>  "tokenMetadata": {<br>    "deedName": "deed_101",<br>    "deedAgreement": "agreement",<br>    "address": "101 Hope Street ",<br>  },<br>  "assetType": "otoken",<br>  "tokenId": "real",<br>  "tokenName": "realestate",<br>  "tokenStandard": "erc1155+",<br>  ...<br>  "quantity": 5,<br>  "createdBy": "oaccount~d722e98f4cjddf20...",<br>  "creationDate": "2023-08-21T12:15:39.000Z",<br>  "isBurned": false,<br>  "tokenUri": "http://...",<br>  "price": 500<br>}</pre> |

FIG. 32

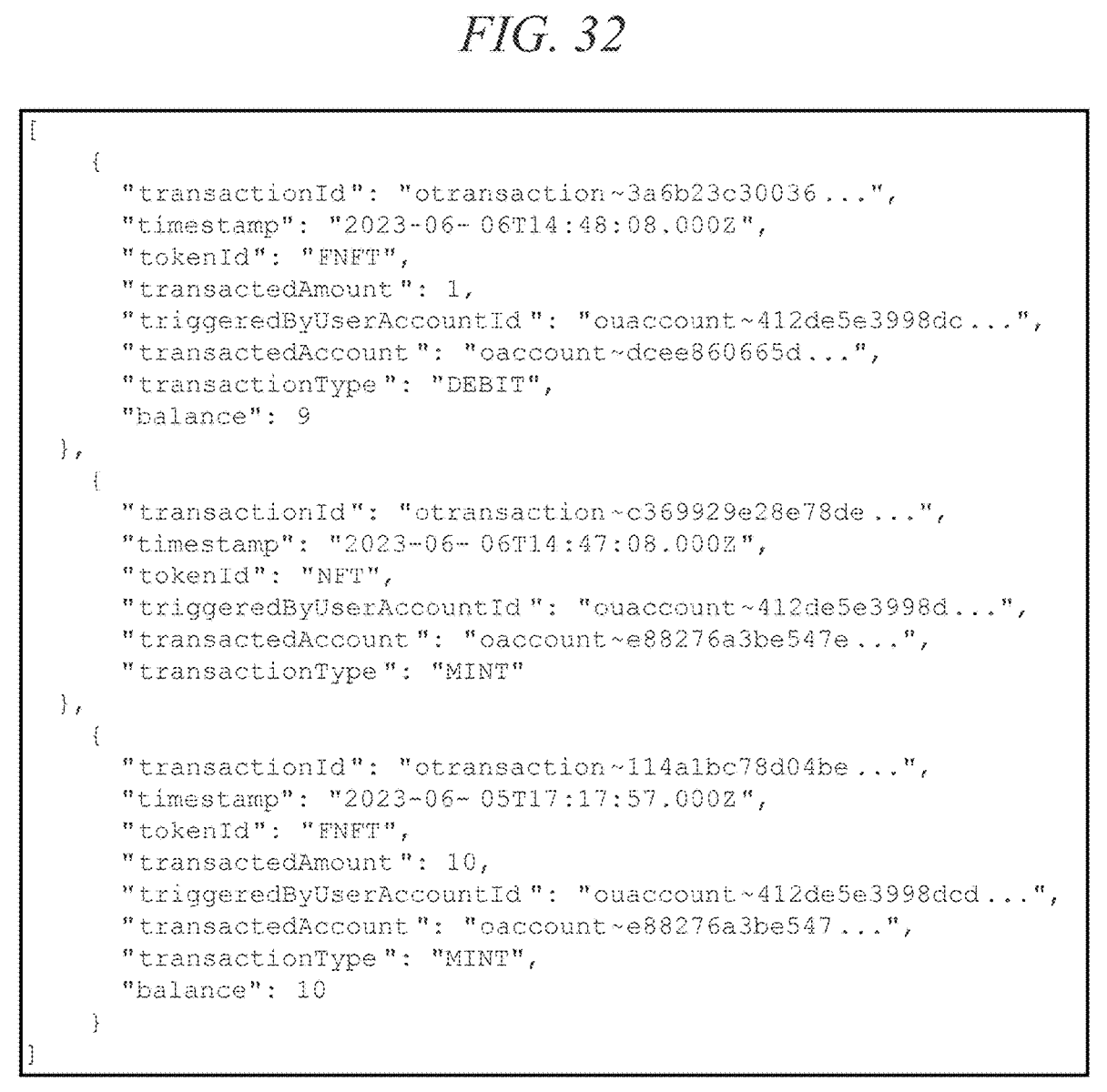

```
[
    {
        "transactionId": "otransaction~3a6b23c30036...",
        "timestamp": "2023-06- 06T14:48:08.000Z",
        "tokenId": "FNFT",
        "transactedAmount": 1,
        "triggeredByUserAccountId": "ouaccount~412de5e3998dc...",
        "transactedAccount": "oaccount~dcee860665d...",
        "transactionType": "DEBIT",
        "balance": 9
    },
    {
        "transactionId": "otransaction~c369929e28e78de...",
        "timestamp": "2023-06- 06T14:47:08.000Z",
        "tokenId": "NFT",
        "triggeredByUserAccountId": "ouaccount~412de5e3998d...",
        "transactedAccount": "oaccount~e88276a3be547e...",
        "transactionType": "MINT"
    },
    {
        "transactionId": "otransaction~114a1bc78d04be...",
        "timestamp": "2023-06- 05T17:17:57.000Z",
        "tokenId": "FNFT",
        "transactedAmount": 10,
        "triggeredByUserAccountId": "ouaccount~412de5e3998dcd...",
        "transactedAccount": "oaccount~e88276a3be547...",
        "transactionType": "MINT",
        "balance": 10
    }
]
```

Figure 34B:
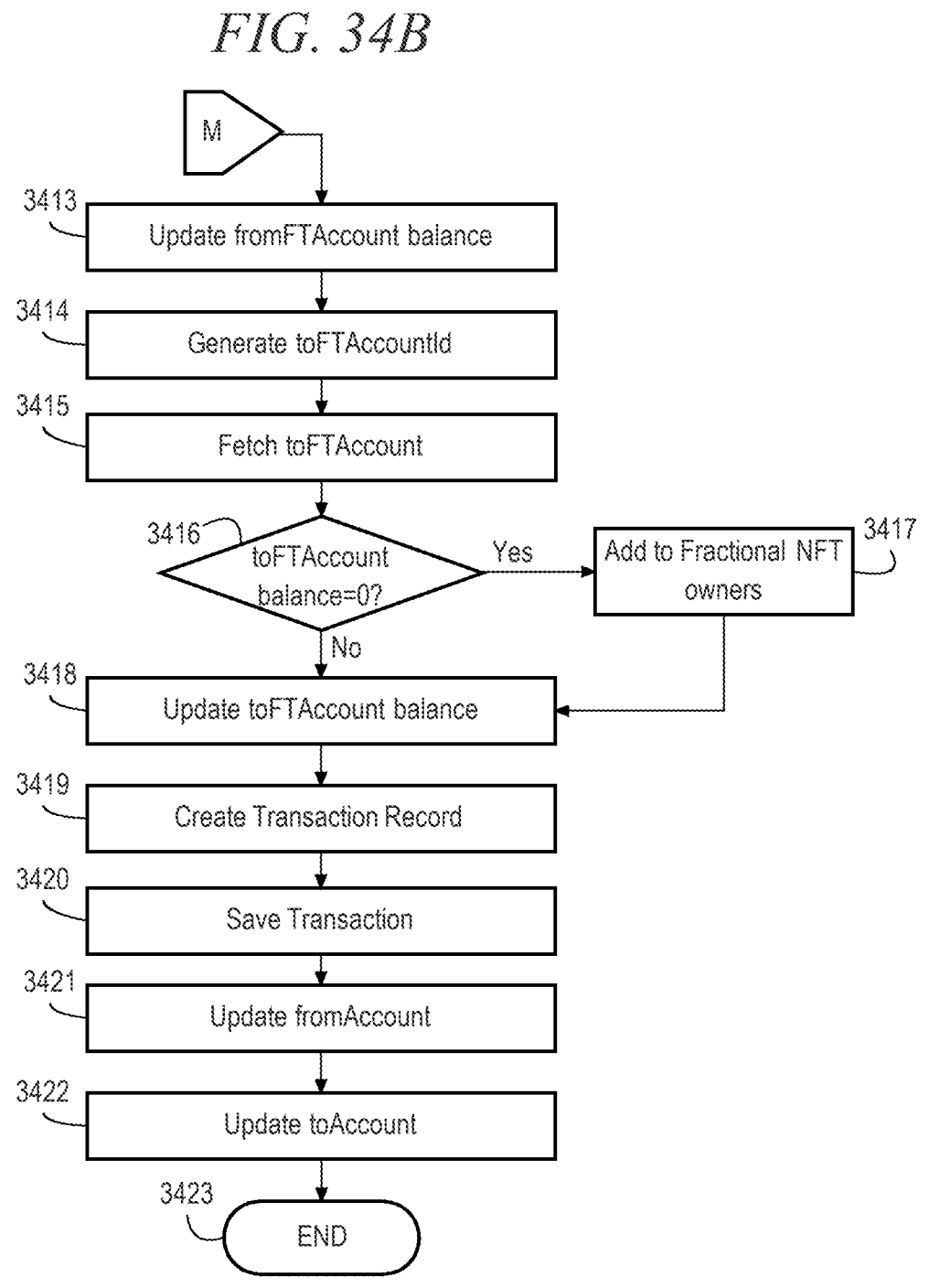

3413 — Update fromFTAccount balance

3414 — Generate toFTAccountId

3415 — Fetch toFTAccount

3416 — toFTAccount balance=0?

→ Yes → 3417 — Add to Fractional NFT owners

No ↓

3418 — Update toFTAccount balance

3419 — Create Transaction Record

3420 — Save Transaction

3421 — Update fromAccount

3422 — Update toAccount

3423 — END

ROBUST, EFFICIENT, AND COMPLETE PROCESS FLOW IMPLEMENTATION OF AN EXTENDED VERSION OF FRACTIONAL NON-FUNGIBLE TOKENS IN A BLOCKCHAIN PLATFORM

FIELD OF THE INVENTION

The present invention relates generally to distributed ledger technology and more particularly to generating blockchain token support from a specification data structure for fractional non-fungible tokens in a blockchain platform.

BACKGROUND

A distributed ledger may be broadly described as a digital record of asset ownership. There is no central administrator of the ledger, nor is there a central data store. Instead, the ledger is replicated across many participating nodes in a computing environment that may be geographically spread across multiple sites, countries, or institutions. A consensus protocol ensures that each node's copy of the ledger is identical to every other node's copy. Furthermore, the set of copies may be viewed as a single shared ledger. A distributed ledger may be used by asset owners using cryptographic signature technology, for example, to debit their account and credit another's account.

A blockchain is a data structure that can be used to implement tamper-resistant distributed ledgers. Multiple nodes follow a common protocol in which transactions from clients are packaged into blocks, and nodes use a consensus protocol to agree on the next block. Blocks carry cumulative cryptographic hashes making it difficult to tamper with the ledger. Each block can have a reference [hash value] to the previous block in time. In addition, each block can comprise its own hash. The blockchain can be traversed backwards (e.g., up the chain).

Permissionless decentralized ledgers allow anonymous participants to maintain the ledger, while avoiding control by any single entity. However, identity, accountability and auditability are difficult in light of the anonymity. In contrast, permissioned decentralized ledgers allow for levels of trust and accountability by allowing explicitly authorized parties to maintain the ledger. Permissioned ledgers support more flexible governance and a wider choice of consensus mechanisms. Both kinds of decentralized ledgers may be susceptible to manipulation by participants who favor some transactions over others. However, the accountability underlying permissioned ledgers provides an opportunity for constraints that can be enforced on participants.

The emerging distributed ledger technology has the potential to allow multiple parties to collaborate in more efficient and effective way, where transactions can be sent to any peer node, and a unique and consensus view will be achieved among all members of the network. No matter for public blockchain or consortium blockchain, the security and performance under large-scale deployment are critical requirements.

A non-fungible token (NFT) is a unique digital identifier that is recorded on a blockchain and is used to certify ownership and authenticity. An NFT can be associated with a particular asset—digital or physical—such as an image, art, music, real estate, or memorabilia. An NFT may confer licensing rights to use the asset for a specified purpose. Ownership of an NFT is recorded in the blockchain and can be transferred by the owner, allowing NFTs to be sold and traded. NFTs can be created by anybody and require few or no coding skills to create. NFTs typically contain references to digital files such as artworks, photos, videos, and audio. Because NFTs are uniquely identifiable, they differ from cryptocurrencies, which are fungible.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 2 illustrates a process flow of creating a fractional FT and controlling its lifecycle using a blockchain app builder in accordance with an embodiment.

FIG. 4 illustrates an example specification data structure for a fractional NFT group in accordance with an embodiment.

FIG. 7 is a flowchart illustrating a process flow for account creation in accordance with an embodiment.

FIG. 8 illustrates user account key/value pair for tracking fungible and non-fungible token accounts for a user in accordance with an embodiment.

FIG. 9 illustrates NFT account key/value pair for tracking the non-fungible tokens of a user in accordance with an embodiment.

FIG. 11 illustrates non-fungible token key/value pair for tracking a non-fungible token in accordance with an embodiment.

FIG. 12 illustrates non-fungible token metadata key/value pair in accordance with an embodiment.

FIG. 13 illustrates non-fungible token class key/value pair in accordance with an embodiment.

FIG. 14 illustrates a composite key for storing owners of a fractional NFT in accordance with an embodiment.

FIG. 15 illustrates a fungible non-fungible token key/value pair for shares of a fractional NFT in accordance with an embodiment.

FIG. 16 illustrates a fungible NFT account key/value pair for tracking ownership of shares of a fractional NFT in accordance with an embodiment.

FIG. 17 illustrates user accounts update in accordance with an embodiment.

FIG. 18 illustrates token account update in accordance with an embodiment.

FIG. 19 illustrates a transaction key/value pair for recording transaction details in the state database in accordance with an embodiment.

FIG. 21 illustrates an internal fungible NFT account update for a user transferring shares of a fractional NFT in accordance with an embodiment.

FIG. 22 illustrates an NFT account update for a share transfer in accordance with an embodiment.

FIG. 23 illustrates creation of an internal fungible NFT account for a user receiving transfer of shares of a fractional NFT in accordance with an embodiment.

FIG. 24 illustrates a composite key for a new owner of shares of a fractional NFT in accordance with an embodiment.

FIGS. 25A-25C are continuous portions of a flowchart illustrating a process flow for multiple minting of a fractional NFT in accordance with an embodiment.

FIG. 26 illustrates an update to the internal FT account of the creator after re-minting a fractional NFT in accordance with an embodiment.

FIG. 27 illustrates an update to the NFT after re-minting the fractional NFT in accordance with an embodiment.

FIG. 29 illustrates an update to a user's internal FT account after burning a share of a fractional NFT in accordance with an embodiment.

FIG. 30 illustrates an update to a user's NFT account after burning all shares of a fractional NFT owned by the user in accordance with an embodiment.

FIG. 31 illustrates an update to a fractional NFT after burning shares of the fractional NFT in accordance with an embodiment.

FIG. 32 illustrates an example report of an account transaction history in accordance with an embodiment.

FIGS. 34A and 34B are continuous portions of a process flow for transferring tokens for exchange in accordance with an embodiment.

DETAILED DESCRIPTION

Figure 1:
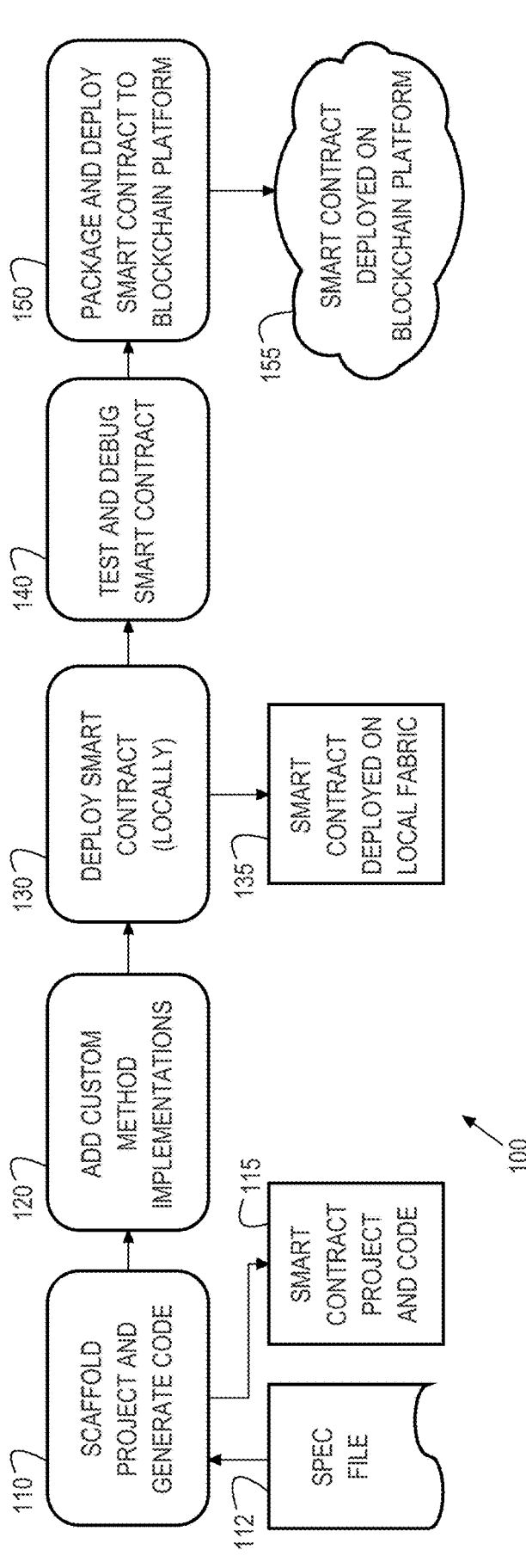
FIG. 1 is a block diagram illustrating development of a smart contact with an app builder in accordance with an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

With NFTs becoming more popular, the cost associated with owning one is quickly increasing. A fractional NFT takes a whole NFT and divides it into smaller fractions, allowing different numbers of people to claim ownership of a piece of the same NFT. It is only through fractionalization that expensive NFTs can be made affordable with ownership democratization. Thus, fractional NFTs provide certain benefits like ensuring affordability and increasing the liquidity in the system. In addition, if one of the fractional owners decides to sell their fraction at a lower price, this would not affect the value of the fractions the other stakeholders hold.

The illustrative embodiments provide a blockchain application builder that generates a fractional NFT application for managing a fractional NFT in a blockchain platform based on a specification data structure. The specification data structure specifies a set of token properties and a set of token behaviors for a fractional NFT. The fractional NFT application is deployed in the blockchain platform to manage a lifecycle of the fractional NFT.

The illustrative embodiments use an account-balance model for implementation of fractional NFTs in the blockchain platform. In response to a user initiating minting of the fractional NFT, the fractional NFT application creates the NFT in the blockchain platform and uses a key-value pair to track ownership of a fungible NFT associated with the NFT. In one embodiment, the fungible NFT is not created in the blockchain and has a token ID that is a concatenation of the token ID of the NFT and a suffix. The fungible NFT represents shares of the fractional NFT. Because a fungible token is divisible, a user can hold a balance of fungible NFTs. Thus, a user can be an owner of the fractional NFT and have the shares represented by a balance of the fungible NFT. The fractional NFT application creates an internal fungible token account for the user to indicate ownership of one or more shares of the fractional NFT as a balance value corresponding to the fungible NFT. The internal fungible token account is not exposed to the user. The fractional NFT application updates a property value in an NFT account of the user to indicate a number of NFTs owned by the user and updates a balance value in the internal fungible NFT account to indicate a number of shares of the fractional NFT owned by the user.

The illustrative embodiments provide a unified flow for the creation of fungible tokens, whole NFTs, and fractional NFTs in the same application chaincode. A single user account tracks all fungible and non-fungible tokens in the blockchain platform. The blockchain application builder has plug-and-play behavior management, allowing the user to add or omit certain token lifecycle behaviors in an implementation. For example, a user can specify, in the specification data structure, whether a fractional NFT is burnable. The illustrative embodiments also provide a locking feature that allows a user to lock an NFT. Locking of NFT can be used when transferring a token to other blockchain network. In such a case, user can lock the NFT in the blockchain platform and then transfer that particular token to another compatible blockchain network, such as Ethereum or Polygon.

All the token lifecycle operations (e.g., mint, transfer, burn, etc.) on fractional NFTs are supported with batch requests. Thus, a user can mint sets of fractional NFTs or burn sets of shares of a fractional NFT in batches.

Furthermore, the flexible and scalable design of the illustrative embodiments allows the user to perform multiple minting of a fractional NFT after creation to increase the total shares of the NFT. For example, in scenarios like intellectual property (IP) sharing, users with a 'minter' role for a fractional NFT can increase the number of shares of the IP that can be owned by users of the blockchain platform.

Alternatively, the specification data structure may restrict minting of additional shares to only the minter of the original fractional NFT. The blockchain application builder provides flexibility for the user to create their own versions of fractional NFTs with behavior management by providing a specification data structure.

The unified flow allows for the exchange of fungible tokens and NFTs between users. Each user account may specify an NFT account and one or more fungible token accounts. Users can create multiple types of tokens (e.g., fungible tokens (FTs), whole NFTs, and fractional NFTs) in a single chaincode. For instance, a user may have one FT account for United States dollars (USD) and another FT account for Euros. One user may exchange an FT with an associated value in United States dollars or Euros with another user for one or more shares of a fractional NFT. This is handled by the application chaincode in a unified flow in the blockchain platform.

The illustrative embodiments provide role-based access control and token ownership-based access control over the assets and their lifecycles. The role-based access control and ownership-based access control mechanism allow users to call specific methods with specific associated roles, such as "Token Admin," "Token Minter," etc. Ownership-based access control can restrict users from accessing assets they do not own. In ownership-based access control, specific methods can be called by users who own the assets, like token owners and account owners.

The account-based model provides flexibility to generate detailed reports, like an account statement, based on transaction history and account history in real time. Other token-related analytics are also enabled, such as total supply of NFTs, net supply, etc. Some embodiments provide high throughput of transactions due to multi-version concurrency control (MVCC) optimization in the blockchain platform.

Blockchain

Blockchain technology has the potential to dramatically enhance enterprise business value by enabling near real-time, distributed transactions across customers' ecosystems and by enabling secure, tamper-proof data sharing. The Hyperledger Fabric blockchain incorporates modular architecture, horizontal/cross-industry technology support, and support for enterprise needs. In accordance with an embodiment, while the Hyperledger Fabric is mentioned in the following detailed description, one of skill in the art would readily understand that different and varied distributed ledgers, blockchains, and/or blockchain platforms can be used with the disclosed methods and systems. These include, but are not limited to, Ethereum, Quorum, Bitcoin, permissioned, and permissionless ledgers. Blockchain technology and Hyperledger Fabric are described in further detail in U.S. Patent Application No. 2023/0097203, filed Oct. 29, 2021, entitled "SYSTEM AND METHOD FOR GENERATING BLOCKCHAIN TOKEN SUPPORT FROM A SET OF DECLARATIONS," the entire contents of which is hereby incorporated by reference as if fully set forth herein.

In accordance with an embodiment, a Hyperledger Fabric is a blockchain platform for distributed ledger solutions underpinned by a modular architecture delivering high degrees of confidentiality, resiliency, flexibility, and scalability. It is designed to support pluggable implementations of different components and accommodate the complexity and intricacies that exist across the economic ecosystem. In accordance with an embodiment, a Hyperledger Fabric delivers an elastic and extensible architecture, distinguishing it from alternative blockchain platform solutions.

Distributed Ledger

In accordance with an embodiment, a blockchain network can comprise a distributed ledger that records transactions that take place on a network. A blockchain ledger is often described as decentralized because it is replicated across many network participants, each of whom collaborate in its maintenance. Decentralization and collaboration are attributes that mirror the way businesses exchange goods and services in the real world. In addition to being decentralized and collaborative, the information recorded to a blockchain is append-only, using cryptographic techniques that guarantee that once a transaction has been added to the ledger it cannot be modified. This property of immutability makes it simple to determine the provenance of information because participants can be sure information has not been changed after the fact. In this way, blockchains can be thought of as systems of proof.

Smart Contracts

A smart contract is a computer program or application or a transaction protocol that is intended to automatically execute, control, or document events and actions according to the terms of a contract or an agreement. The objective of smart contracts is the reduction of need for trusted intermediators, arbitration costs, and fraud losses, as well as the reduction of malicious and accidental exceptions. In accordance with an embodiment, in order to support the consistent update of information, and to enable certain ledger functions (transacting, querying, etc.), a blockchain platform uses smart contracts to provide controlled access to the ledger. In accordance with an embodiment, smart contracts are not only a key mechanism for encapsulating information and keeping it simple across the network, but they can also be written to allow participants to execute certain aspects of transactions automatically.

Consensus

In accordance with an embodiment, the process of keeping the ledger transactions synchronized across the network—to ensure that ledgers only update when transactions are approved by the appropriate participants, and that when ledgers do update, they update with the same transactions in the same order—can be referred to as consensus. In accordance with an embodiment, a blockchain can be thought of as a shared, replicated transaction system which is updated via smart contracts and kept consistently synchronized through a collaborative process called consensus.

Cloud Service

In accordance with an embodiment, a system, such as a cloud system (e.g., blockchain cloud service (BCS)), can utilize the above described Hyperledger Fabric as a starting point. Such a system offers a highly advanced and differentiated enterprise-grade distributed ledger cloud platform that allows for the building of new blockchain-based applications and/or the extension of existing Software as a Service (SaaS), Platform as a Service (PaaS), and infrastructure as a Service (IaaS), and on-premises applications.

In accordance with an embodiment, the system can support mission-critical enterprise needs such as scalability, security, robustness, integration, and performance to remove barriers to adoption and support blockchain applications in production. The system allows for users to deploy, configure, manage, and monitor the blockchain platform and reduce the cost for deploying the blockchain platform in enterprises by providing a blockchain cloud service as a Platform as a Service (PaaS) Cloud solution. The system also accelerates the development and integration of blockchain applications with other platforms.

Chaincode

Hyperledger Fabric smart contracts are written in chaincode and are invoked by an application external to the blockchain when that application needs to interact with the ledger. In most cases chaincode only interacts with the database component of the ledger, the world state (querying it, for example), and not the transaction log. Thus, chaincode is an implementation of smart contracts in the Hyperledger Fabric blockchain platform to provide the computer application or program for automatically executing, controlling, or documenting events and behaviors of specified objects, such as fungible and nonfungible tokens, as will be described below.

In accordance with an embodiment, chaincode can comprise software defining an asset or assets, and the transaction instructions for modifying the asset(s). In other words, chaincode is the business logic. Chaincode enforces the rules for reading or altering key/value pairs or other state database information. Chaincode functions execute against the current state database of the ledger and are initiated through a transaction proposal. Chaincode execution results in a set of key/value writes (write set) that can be submitted to the network and applied to the ledger on all peers.

Blockchain APP Builder

In accordance with an embodiment, an application builder (also referred to herein as "app builder" or "blockchain app builder") is provided within or associated with a blockchain platform, such as the blockchain could service described above. The blockchain app builder is a tool set that assists with rapid development, testing, debugging, and deployment of smart contracts (e.g., chaincode) on blockchain platform networks, such as cloud BaaS (Blockchain as a Service) nodes on blockchain cloud service infrastructure and/or on-premises nodes.

In accordance with an embodiment, as described above, a smart contract (also referred to as a "chaincode" herein) defines the different states of an object between two or more parties and logic that validates and implements changes as the object moves between these different states. At the heart of every blockchain application is one or more chaincodes. Thus, it is important that a chaincode should be bug-free and tested before it is deployed and instantiated.

Tokenization is a process where tangible (i.e., physical) or in-tangible (i.e., digital) assets are converted into tokens that can be moved, stored, or recorded into a blockchain. A token is a digital representation of any real tradeable asset. Representing assets as tokens allows one to use the ledger to establish state and ownership of an asset, and leverage that to transfer ownership of an asset. The blockchain app builder can be used for rapid development, testing, debugging, and deployment of chaincodes to blockchain platform networks, comprising cloud BaaS nodes on Oracle Cloud Infrastructure or on-premises nodes using Enterprise Edition. The blockchain app builder can generate complex chaincodes from a simple configuration file and assets specification in TypeScript (for Node.js chaincode) and Go (for Golang chaincode) from a simple specification file.

FIG. 1 is a block diagram illustrating development of a smart contact with an app builder in accordance with an embodiment. In accordance with an embodiment, a blockchain app builder is utilized by a user or developer to build and scaffold a fully functional chaincode project from a specification file 112. In one embodiment, the specification file 112 is developed within a command line interface (not shown). After the project is built, the user or developer can run and test it on a local fabric network (e.g., Hyperledger Fabric) for example, or the user's or developer's provisioned instance.

In accordance with an embodiment, a user or developer can utilize a local command line interface tool that works with the CLI (command line interface) of the app builder, or the user can interface directly with a CLI of the app builder. The user or developer can create a specification file 112, and then run an initialization process to scaffold the project and generate code (block 110), which results in a generated smart contract project and code 115. The generated smart contract project and code can be stored at a memory associated with the app builder.

After the chaincode project 115 is created, custom method implementations can be added (block 120) to the generated smart contract and code. In order to test and debug the generated smart contract and code, the smart contract is deployed (block 130), e.g., smart contract deployed on a local fabric 135. Optionally, the smart contract project can be deployed remotely to a user's or developer's BCS instance. Once the chaincode is running on a network (e.g., a local fabric or a BCS instance), the chaincode and the generated methods can be tested and debugged (block 140). This can be an iterative process in which the testing and debugging results in updates to the specification file 112, and the process can start again. In accordance with an embodiment, after the specification file is completed, debugged, and tested, the app builder can package and deploy the smart contract (block 150) such that the smart contract is deployed on the blockchain platform 155 (e.g., smart contract deployed on a BCS instance).

Fractional Non-Fungible Token

In accordance with an embodiment, the blockchain app builder includes support for fractional non-fungible tokens, which can be part of the same chaincode as fungible tokens and whole non-fungible tokens. This allows the transfer and exchange of multiple types of tokens within the same chaincode.

Fungible assets are replaceable by another identical item and mutually interchangeable. An example of a fungible asset is a dollar bill; one dollar bill can be interchanged with any other dollar bill and represent the same asset. Another example of a fungible asset is a unit of cryptocurrency, such as Bitcoin or Ethereum. On the other hand, something is a non-fungible asset if it cannot be interchanged with something else. Examples of non-fungible assets include art, real estate, memorabilia, etc. A non-fungible token (NFT) is a unique digital identifier that is recorded on a blockchain and is used to certify ownership and authenticity of an asset. It cannot be copied or substituted. The ownership of an NFT is recorded in the blockchain and can be transferred by the owner, allowing NFTs to be sold and traded.

A whole NFT cannot be subdivided, meaning an NFT has a single owner. A fractional NFT (F-NFT) is a whole NFT fragmented into smaller pieces, enabling different investors to enjoy partial ownership of a high-value NFT, like an NFT representing ownership of a luxury yacht, real estate, or valuable memorabilia (e.g., a game-worn jersey from an historic sporting event). Smaller fractions of an NFT enable more investors to have a share in the ownership of the same asset alongside others.

Figure 2:
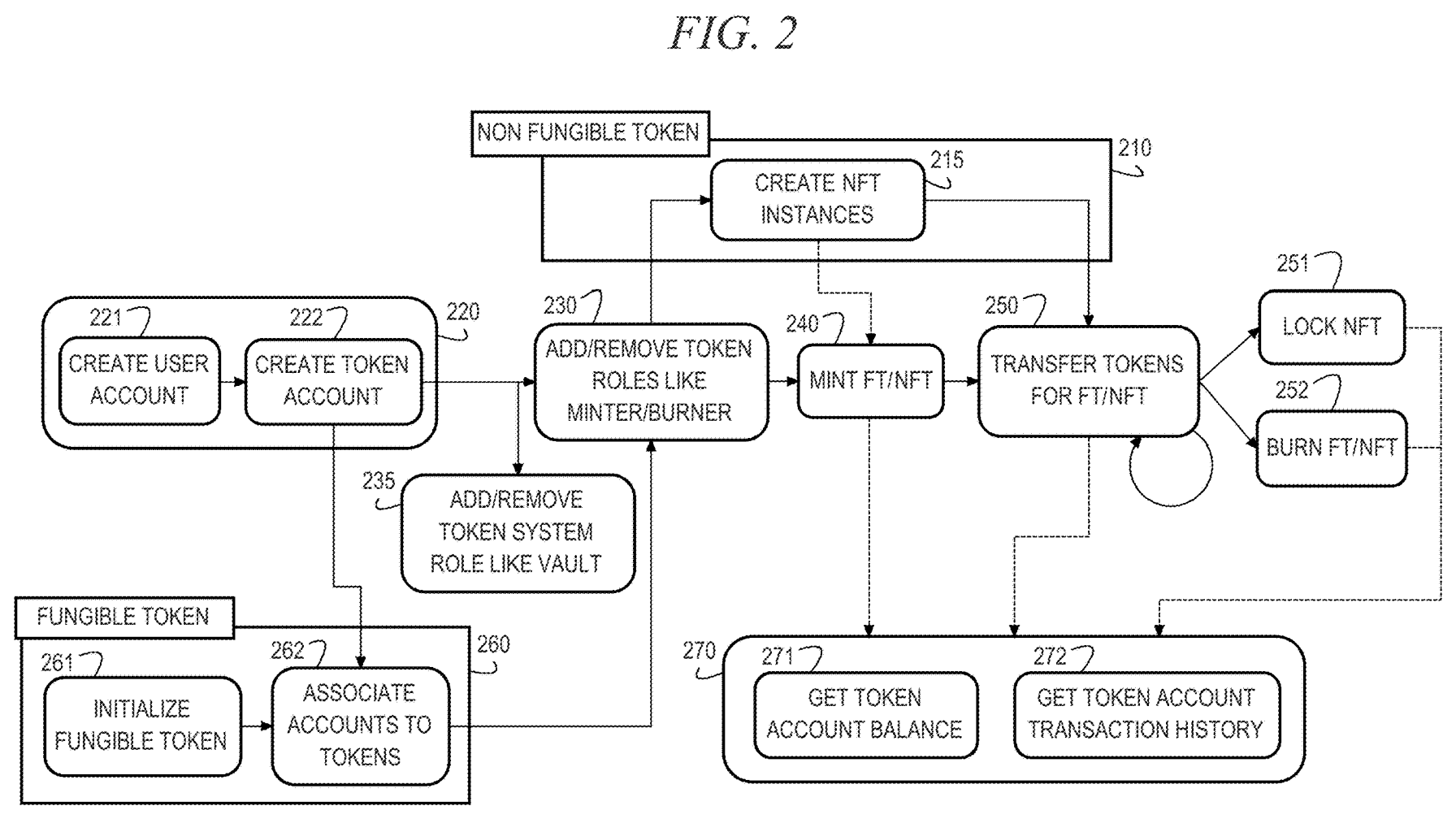

FIG. 2 illustrates a process flow of creating a fractional FT and controlling its lifecycle using a blockchain app builder in accordance with an embodiment. The process flow includes token management, account management, mintable behavior, role management, transferrable behavior, burnable behavior, and lockable behavior. Auto-generated token initialization and lifecycle operations provide a complete set of methods and application programming interfaces (APIs) for issuing (minting), transferring, and burning tokens.

Account Management

Instead of triggering two methods to create user accounts and token accounts separately, account management portion 220 of the data flow uses a single method to create the user account (block 221) and create token accounts (block 222). A user account is created for each user of the blockchain platform. The user account specifies one NFT account and/or one or more fungible token (FT) accounts. The NFT account tracks all of the NFTs owned by the user. Each FT account tracks FTs of a given type owned by the user. For example, the user may have one FT account for USD and another FT account for Euros. In some embodiments, a user may have an FT account for a given cryptocurrency, such as Bitcoin or Ethereum.

Creation of accounts is described in further detail below with reference to FIGS. 7-9.

Role Management

In an embodiment, a user account has one or more roles. The chaincode (smart contract, application) adds or removes token roles (e.g., Token Minter or Token Burner) (block 230) and adds or removes token system roles (e.g., Vault) (block 235). Role-based security ensures that only specified accounts can mint, escrow, and burn tokens. Roles regarding token behavior (e.g., Token Minter or Token Burner) are assigned to users' token accounts. One user may have a Token Minter role for minting FTs of type USD and not have a Token Minter role for minting FTs of type Euros. A different user may have a Token Minter role for minting NFTs.

Token Management

In the fungible token portion 260 of the process flow, the user can initialize a fungible token (block 261) and associate accounts to tokens (block 262). For instance, a user with the appropriate role may initialize a fungible token representing an amount in U.S. dollars. The initialized FT is then associated with the user's FT account corresponding to USD.

Mintable Behavior

The term "minting" refers to writing a FT or an NFT object to the blockchain (ledger) to establish its immutable record of authenticity and ownership, publishing a unique digital asset on the blockchain so that it can be bought, sold, or traded, or creating a new, unique digital object on the blockchain by converting a digital file (e.g., digital art, photograph, video, etc.) into a digital asset stored on the blockchain. For an initialized NFT, a user with the Token Minter role can mint the NFT to add the NFT to the blockchain (block 240).

In the NFT portion 210 of the process flow, a user with the appropriate role (e.g., Token Creator) can create NFT instances (block 215) using a specification file, described in further detail below. A user with the appropriate role (e.g., Token Minter) can then mint an NFT (block 240). When a user creates an instance of a whole NFT and mints the NFT, the NFT object is written to the blockchain so that it can be bought, sold, or traded by users of the blockchain platform. Token creation is described in further detail below with reference to FIGS. 10A, 10B, and 11-19.

A user having a Token Minter role can also re-mint an F-NFT to increase the number of shares. For example, a user may create an F-NFT representing ownership of an asset with three shares, meaning three different users can own a share of the F-NFT. Under the covers, the process flow tracks ownership of a fungible non-fungible token that references the F-NFT. The term "fungible non-fungible token," as used herein, refers to a fungible representation of the F-NFT to account for ownership of shares of the F-NFT. There is no actual token for the fungible non-fungible token in the blockchain; rather, a balance of a fungible token represents a number of shares owned. In one embodiment, the token ID of the fungible non-fungible token is a concatenation of the token ID of the F-NFT and a suffix. This fungible non-fungible token is used as an accounting mechanism for tracking ownership of shares of the F-NFT. A given user may have a balance of two shares of the F-NFT, represented as a balance of 2 in the user's fungible NFT account corresponding to the fungible NFT that represent shares of the F-NFT. When a user buys or is transferred a share of the F-NFT, the underlying fungible NFT is not exposed to the user. If the creating user then re-mints the F-NFT to have four shares, then the process flow increases the quantity of the F-NFT and increases the balance owned by the creating user in the appropriate fungible NFT account.

Token re-minting, or multiple minting, is described in further detail below with reference to FIGS. 25A-25C, 26, and 27.

Transferrable Behavior

Once created and minted, fungible tokens, whole NFTs, and fractional NFTs can be transferred among users of the blockchain platform (block 250). As stated above, the process flow manages transfer of fungible tokens, whole NFTs, and fractional NFTs in the same flow. For FTs and whole NFTs, transfer of tokens is relatively straightforward.

For F-NFTs, the NFT itself tracks the owners of the NFT, and the fungible NFT accounts of the users track ownership of the shares of the NFT. For example, an NFT having five shares can have three owners: Sam, Tom, and Sally. Sam may own two shares, Tom may own two shares, and Sally may own one share. Sam, Tom, and Sally are specified as owners of the NFT. This is recorded as one or more transactions in the NFT in the blockchain and in the token accounts of the users. Under the covers, Sam is specified as the owner of two shares of the F-NFT using a balance value in Sam's fungible NFT account corresponding to the fungible NFT, Tom is specified as the owner of two shares of the F-NFT using a balance value in Tom's fungible NFT account corresponding to the fungible NFT, and Sally is specified as the owner of one share of the F-NFT using a balance value in Sally's fungible NFT account corresponding to the fungible NFT. This is also recorded as one or more transactions in the blockchain and in the token accounts of the users.

If Tom then transfers a share of the NFT to a fourth user, Jane, then the process flow records the transfer by updating the NFT to add Jane as a user and updates the token accounts of Tom and Jane to reflect ownership of the NFT and the shares represented by balance in the fungible NFT accounts. This is recorded as one or more transactions in the blockchain and in the token accounts of the users. Token transfer is described in further detail below with reference to FIGS. 6A, 6B, 20A-20C, and 21-24.

Lockable Behavior

Token staking refers to a token owner locking up their digital asset for a certain period of time, earning rewards while doing so. Some collections allow owners to stake an NFT for an indefinite lockup period, while others have strict limits for how long NFTs must be staked. In accordance with an embodiment, locking of NFT (block 251) can also be used when transferring a token to another blockchain platform. In such a case, a user can lock the NFT in the blockchain platform and then transfer that particular token to another compatible blockchain network, such as Ethereum or Polygon, for example. Locking an NFT, such as an F-NFT, is recorded as one or more transactions in the blockchain.

Burnable Behavior

A token is "burned" when it becomes disabled from individual ownership. This may be achieved by flagging token shares as burned. In accordance with an embodiment, burning fungible tokens, whole NFTs, shares of F-NFTs, and all shares of F-NFTs are managed in the same process flow in block 252. The process flow records burning of a share of an F-NFT in the underlying fractional NFT that represents the share and in the number of shares specified in the NFT. Thus, burning a share of an F-NFT is recorded as one or more transactions in the blockchain, in the NFT, and in the underlying fungible NFT.

A user with a token burner role can burn his own shares of a fractional NFT. For transferring a fractional NFT to any other blockchain environment, the user must own all shares of the fractional NFT.

Account Statistics and Analytics

In the account statistics and analytics portion 270 of the process flow, a user can get token account balance (block 271) or get token account transaction history (block 272). In accordance with an embodiment, the user accounts and transaction histories are accessible for generating reports. The data model used by the process flow includes key-value pairs and metadata that are searchable for analytics and report generation.

Token Creation Using Specification File

In accordance with an embodiment, tokenized asset details and its properties are specified in a specification file or data structure. The token details include the anatomy of token, i.e., its type, unit, token behavior, and its behavior properties. In some embodiments, a standard can be followed, such as TTF, in order to help structure the token and have certain behaviors and roles across all tokens. The behaviors of a token depend on the type and unit of token. For the fungible and fractional tokens, for example, behaviors such as "mintable", "transferable", "divisible", "roles," and "burnable" can be supported.

The specification file can be used to generate the necessary model and controller files with token related methods. These out-of-the-box controller methods can help users and developers with initializing tokens, access control, account setup, role management and managing lifecycle of tokens. With these methods, a user or developer can start the lifecycle of token immediately and require no additional coding.

Figure 3:
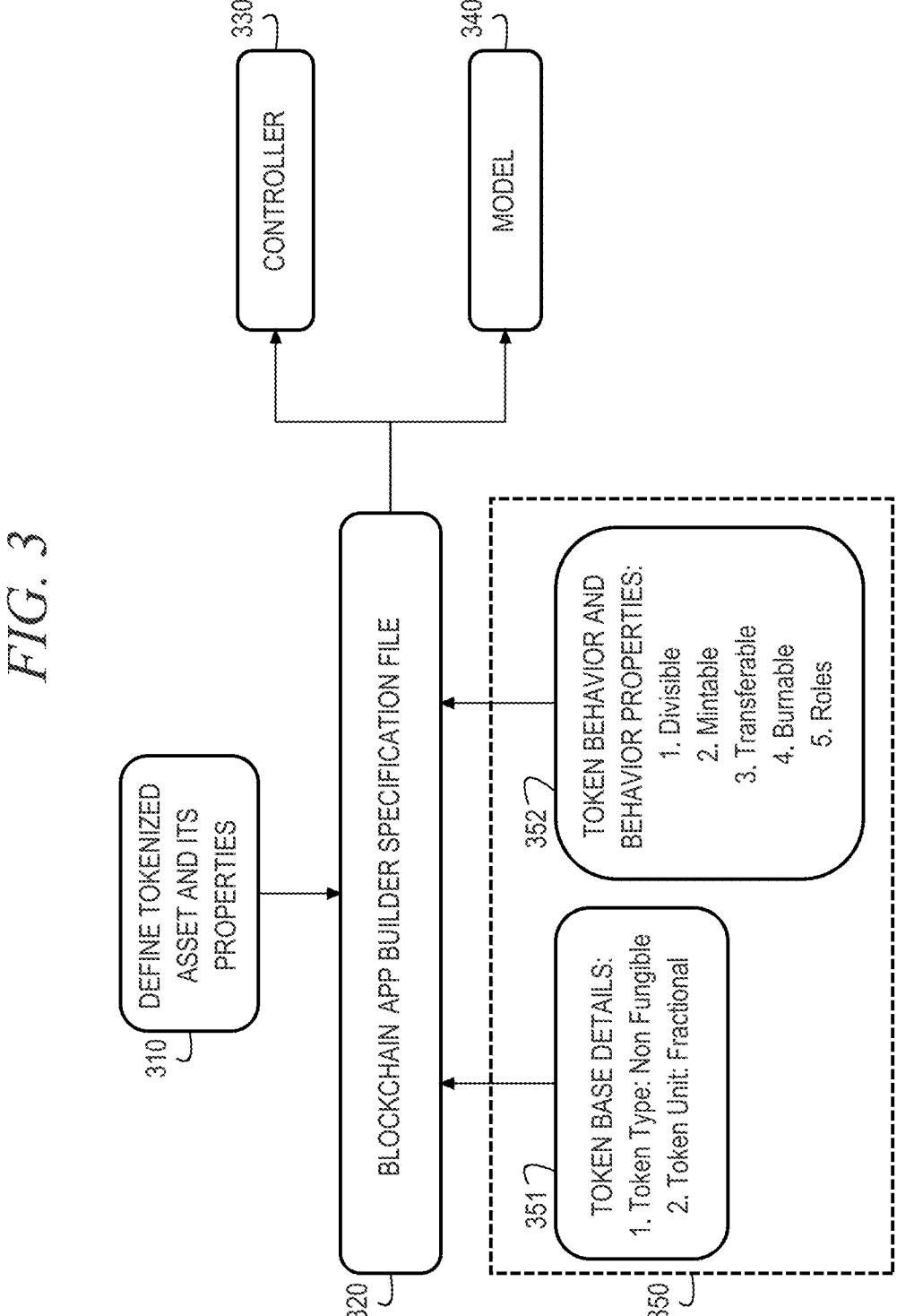
FIG. 3 is a flowchart of a tokenization within a blockchain cloud environment in accordance with an embodiment.

FIG. 3 is a flowchart of a tokenization within a blockchain cloud environment in accordance with an embodiment. More specifically, FIG. 3 illustrates a tokenization process utilizing an app builder, as described above, in accordance with an embodiment. In accordance with an embodiment, the app builder, as described with reference to FIG. 1, can be utilized by a user or developer to build, test, and deploy chaincode to a chaincode container. Such developer chaincode can be, for example, smart contracts or other business logic that can be utilized within the user's or developer's blockchain ledger. The app builder component of a blockchain, blockchain cloud system, or other blockchain platform (e.g., Oracle Blockchain Platform) can provide a mechanism to define blockchain assets using a declaration or specification file 320, and then generate a blockchain smart contract that supports those assets, i.e., tokens.

In accordance with an embodiment, the app builder can comprise or be associated with an interface, such as a command line interface (CLI), extension for visual studio code. The interface can be utilized by a user or developer to build or change a specification file that provides a framework for the app builder to scaffold and build a token (or tokens).

In accordance with an embodiment, a tokenization flow follows these basic steps. At 310, the system and methods can accept inputs indicative of or comprising details, configurations, or other data placed into a specification file 320. Such inputs can be indicative of a user's or developer's choices/designs on what token behaviors to specify (e.g., mintable, transferable, divisible, holdable, burnable, and roles). The token assets, behaviors, and properties can be defined at the input specification file 320.

The token chaincode project from the input specification file can be scaffolded. This creates a scaffolded project, including a model 340 that contains the token asset definition and its properties and a controller 330 that contains the token's behavior and methods. Additionally, the scaffolded token project can reflect token standards 350, such as TTF or ERC20, and include the base details of the token 351, such as a token type (e.g., fungible or non-fungible) and a token unit (e.g., fractional). The token standards 350 can also reflect the token behavior and behavior properties 352, such as whether the token is divisible (e.g., decimal), mintable, transferrable, burnable, holdable, as well as roles associated with tokens, such as minter, burner, admin, etc. In accordance with an embodiment, once the token has been scaffolded and generated, the token can be deployed and tested, e.g., either at a local fabric, or onto a cloud based distributed ledger, such as BCS described above.

In accordance with an embodiment, once a token-based project has been deployed, the typical flow for creating tokens and completing lifecycle operations follows these steps. The user or developer that instantiates the token chaincode becomes the Token Admin of the chaincode. A tokenized asset is initialized, which creates the tokenId, a unique identifier for that particular instance of token. Accounts can be created for every user who will possess tokens or complete token-related operations.

In accordance with an embodiment, if the roles behavior is specified for the token, then roles are added to user/token before a user of the token can complete token-related operations. Conversely, if a role is defined with the specification file, but is not assigned to any token/user, then each token/user can utilize that role. For example, if a burner role is defined within the specification file, but no token is assigned to the burner role, then all tokens will have the burner role. In accordance with an embodiment, token life cycle methods can then be used, based on the behaviors that were specified for the token asset. For example, the mintBatch method can be called to mint tokens for an account.

FIG. 4 illustrates an example specification data structure for a fractional NFT group in accordance with an embodiment. As seen in FIG. 4, the specification file (data structure) includes a plurality of attributes, including name, type, standard, anatomy, behavior, properties, metadata, and custom methods. In the depicted example, the name of the F-NFT indicates that the instance of the F-NFT is for a real estate property. The anatomy attributes indicate that the F-NFT is non-fungible and fractional.

The behavior assets indicate that the F-NFT is divisible and mintable with a maximum mint quantity of 100. The maximum mint quantity sets a limit to the number of F-NFTs that can be minted for the F-NFT group. The behavior assets also indicate that the F-NFT is transferable and burnable.

The properties of the F-NFT indicate a price for the F-NFT and a Boolean property indicating whether the F-NFT is on sale. The metadata includes descriptive assets of the F-NFT, such as deed name, description of the real estate property, address of the real estate property, and deed agreement. The metadata provides searchable assets for the F-NFT to be used for searching, statistics, and analytics.

In accordance with an embodiment, the custom methods field in the specification file creates invokable custom method templates in the main controller file. It takes the method signature and creates the method declaration in the controller file. This property also follows the same behavior as 'customMethods' property in normal asset. In accordance with an embodiment, after the chaincode project is created, custom method implementations can be added to the generated smart contract and code. These custom methods are specified in the specification data structure, as shown in FIG. 4

Tokenization Stack

As a part of above chaincode generation process, fully functional and executable Token APIs are made available in the controller to be invoked directly. These automatically generated Token APIs cover the entire lifecycle of tokens and various other system/audit actions and can be executed without any additional coding. The methods include setting up of tokens, setting up of roles, creating accounts, transactions and all token lifecycle behavior operations like mint, transfer, hold, burn, etc., the transaction or account history, and many others. These methods use Token software development kit (SDK) to perform its operations.

The SDK classes and methods are built on top of existing aApp Builder Core SDK. Core SDK provides support for rapid development by including features like transparent persistence capability (ORM), CRUD methods, automatic validation of arguments, marshalling/un-marshalling. All these happens behind the scenes and the developer can call them out with only couple of lines of code. The SDK provides interfaces and implementations using the underlying Fabric shim methods of Node.js and Go languages.

Figure 5:
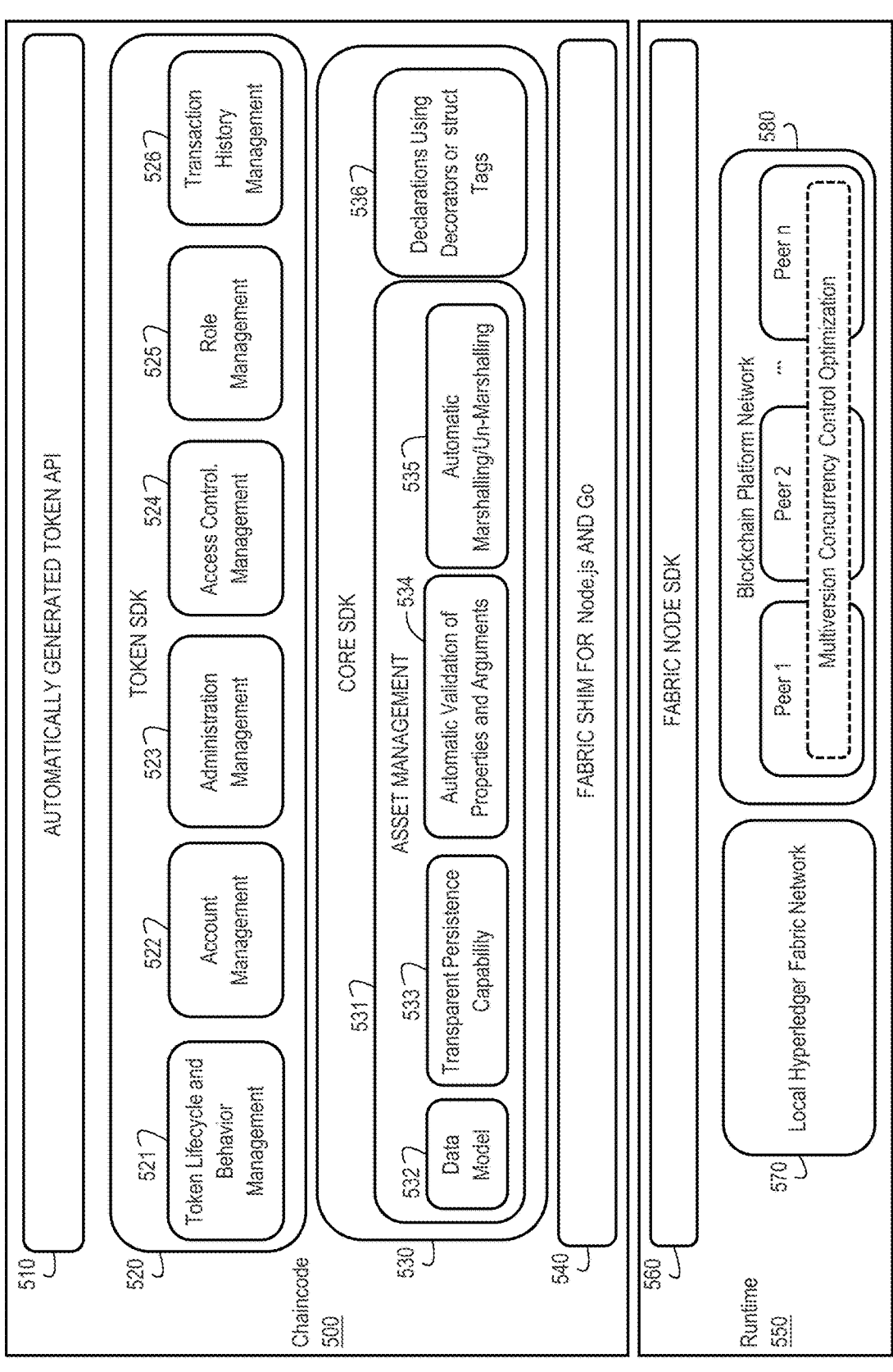
FIG. 5 illustrates an architecture of a token implemented by an app builder in accordance with an embodiment.

FIG. 5 illustrates an architecture of a token implemented by an app builder in accordance with an embodiment. More specifically, FIG. 5 shows a token architecture implemented by a blockchain app builder, including the token API and token software development kit (SDK). The blockchain app builder can generate token related class and methods. It also provides a tokenization related SDK to help developers code complex token specific business logic. These classes and methods can be built on top of existing app builder core SDK. The SDK provides interfaces and implementations using the underlying Fabric shim methods of Node.js and Go languages.

In accordance with an embodiment, as a part of chaincode generation process, certain token APIs are made available to be invoked directly at runtime. These automatically generated token APIs cover the entire lifecycle of tokens and can be executed without any additional coding. The methods include setting up of tokens, setting up of roles, creating accounts, transactions and all token lifecycle behavior operations like mint, transfer, burn, etc. These methods use token SDK 520 to perform its operations.

The exemplary token architecture can comprise a chaincode portion 500 as well as a runtime portion 550. The chaincode can comprise an automatically generated token API 510, a token SDK (service development kit) 520, a core SDK 530, and a fabric shim for, e.g., node.js and Go 540. Token SDK 520 implements the underlying token lifecycle behaviors 521, the methods for account management 522, administration management 523, access control management 524, role management 525, and transaction history management 526. This SDK can be used by developers to code complex token specific business logic in custom methods.

In accordance with an embodiment, access control management 524 can be used to provide the tokenization feature with access control. Certain methods can be invoked only by the 'Token Admin' or 'Account Owner' of the token. With this feature, a user/administrator can ensure that certain operations are carried out only by the intended/authorized user. Any misuse will result in an error. Access control 524 can be utilized with a plug-and-play design. If a user/administrator wants to use their own access control or none at all, the user/administrator can remove the corresponding SDK code from the auto-generated controller methods.

Methods are provided for adding or removing of roles to an account via role management 525. These methods can be called if 'roles' behavior is enabled for a token. Once roles are set, certain token behavior methods can be invoked if the role matches for the given account.

Administration management 523 can be used when a token chaincode is instantiated. Then, a list of users is specified. These users become the 'Token Admin' of the chaincode. Methods can be provided for a 'Token Admin' to add/remove other admins.

In accordance with an embodiment, token lifecycle and behavior management 521 can govern behaviors of a token. The behaviors of a token depends on the type and unit of token. For fungible tokens and fractional NFTs, behaviors including "mintable," "transferable," "divisible," "roles," and "burnable" can be supported. Methods are available which implement all the above behaviors for a given token. These methods represent the lifecycle of a token.

Transaction history management 526 can provide methods to fetch transaction records for an account and the history of a transaction as well. This can be called by a user or administrator directly. Older transaction records can be deleted by the user or administrator to save space, but it is available in the history database.

In accordance with an embodiment, the generated core SDK 530 can comprise asset management 531, which can comprise a data model 532, transparent persistence capability 533, account validation of properties and arguments 534, and automatic marshalling/unmarshalling 535. Core SDK 530 can further comprise declarations using decorators and struct tags 536.

In accordance with an embodiment, Token SDK 520 is built on top of core SDK 530. The core SDK provides support for rapid development by including features like transparent persistence capability (ORM), CRUD methods, automatic validation of arguments, marshalling/un-marshalling. A developer can call them out with only couple of lines of code. Every asset created by App Builder comprises certain features. The asset management 531 feature can be used to manage and configure the assets quickly, which reduces the development time.

In accordance with an embodiment, assets are modelled as individual classes that follow the model-controller pattern. Users or administrators can utilize data model 532 to specify the properties of the asset. Then, the operations on the asset are managed by core SDK 530. This provides a simpler way for the user or administrator to create an application and focus only on the business logic. With this model, assets can have relationships with other assets using an embedded asset or referenced asset.

In accordance with an embodiment, with transparent persistence capability 533, assets can be mapped as an ORM (object-relational mapping) by which user can perform basic CRUD operations on the stateDB with a single statement. All the validations, marshalling/un-marshalling, write/query to stateDB happens behind the scenes.

In accordance with an embodiment, with automatic validation of properties and arguments 534, certain validations can be applied on asset properties and method arguments using simple decorators or struct tags. All the implementation details for those validations are managed by core SDK 530. The automatic marshalling/unmarshalling 535 can be used when working with the state database and with data that needs to be converted from bytes to JSON and vice versa, for example. This transformation is done automatically by core SDK 530 and the user or administrator does not need to intervene. Declarations using decorators or struct tags 536 can be used to provide support for above features like validation and marshalling/unmarshalling (e.g., via various decorators or struct tags). With this, a user/administrator can simply declare the required behavior in a single statement.

Fabric Shim for Node.js and Go 540 can be utilized by the SDK for the implementation of all the above features. Fabric shim provides the chaincode interface, a low-level API for implementing chaincodes and communicating with fabric.

The runtime 550 can comprise a fabric node SDK 560 and can be associated with a local fabric network 570, or a BCS network 580. Within the runtime 550, chaincode generated using App Builder can be deployed in a fabric network, such as a Hyperledger Fabric, running in local system 570, or in a blockchain cloud service network 580, such as BCS. The Fabric Node SDK 560 is used to interact with a blockchain fabric such as a Hyperledger Fabric blockchain network, for example.

In accordance with an embodiment, from app builder, a Hyperledger Fabric network can be created and run in, e.g., a user's local system (local fabric network 570). The chaincode can then be executed and tested locally using Fabric Node SDK 560. In accordance with an embodiment, the generated chaincode can be deployed to a remote (not at a user's or administrator's local system) blockchain cloud service network 580 from App Builder using Fabric Node SDK 560. The chaincode can also be executed and tested remotely from app builder.

Access Control

App Builder tokenization support includes an access control feature and supports role-based access control and ownership-based access control mechanism. In the role-based access control, users can call specific methods with specific associated roles, like "Token Admin," "Token Minter," and "Token Burner." In the ownership-based access control, users can be restricted from accessing assets they do not own. In ownership-based access control, specific methods can be called by users who own the assets, like "Token Owners" and "Account Owners."

In accordance with an embodiment, a new type of role is provided within App Builder called "TokenSysRole." These roles are independent of assets or any asset level property but also do not have special privileges like admins or org admins. Currently App Builder supports a "Vault" role to create a vault manager which can be used for locking of NFT.

Example Use Case

Figure 6A:
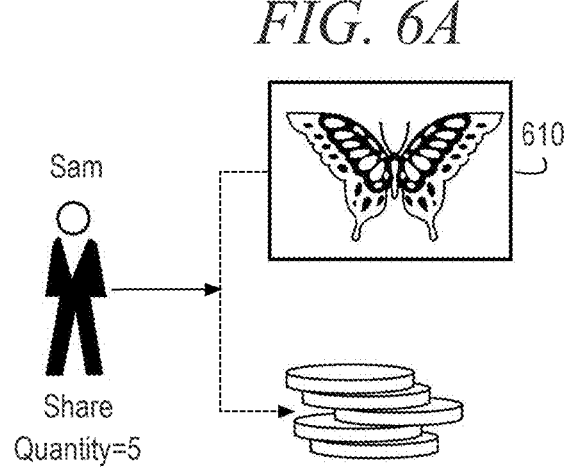
FIG. 6A illustrates an example use case of minting of a fractional NFT in accordance with an embodiment.

FIG. 6A illustrates an example use case of minting of a fractional NFT in accordance with an embodiment. More specifically, the use case shown in FIG. 6A is for a fractional NFT (F-NFT), but this use case can be extended for other use cases. A marketplace is run by a curator, Sam, on the blockchain platform. Sam mints an NFT by providing details like metadata, custom properties, token uniform resource locator (URI), etc., and the token quantity (i.e., number of shares). If the token quantity is greater than 1 (one), then it implies that the same NFT can be shared with multiple token owners. In an embodiment, if the token quantity is equal to 1 (one), then this may imply that the NFT is to be minted as a whole NFT. However, in an alternative embodiment, if the token quantity is equal to 1, then this may indicate that the NFT is to be minted with a single share but has the capability of being re-minted to increase the number of shares. In other words, the NFT is minted as an F-NFT with one share with the capability of being re-minted to any number of shares up to a specified maximum share quantity. In the example shown in FIG. 6A, Sam creates an NFT 610 with five shares. Initially all five shares are owned by Sam.

Figure 6B:
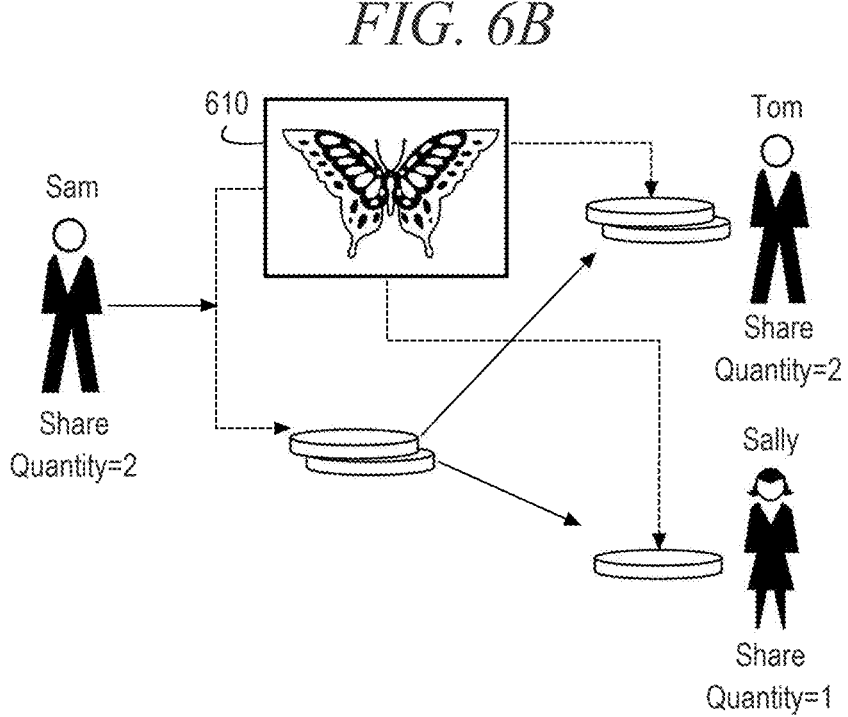
FIG. 6B illustrates an example use case of transferring a share of a fractional NFT in accordance with an embodiment.

FIG. 6B illustrates an example use case of transferring a share of a fractional NFT in accordance with an embodiment. After the NFT is minted by Sam, he can now transfer a portion of the NFT to a few of his friends. The NFT is now shared with Tom (NFT buyer) and Sally (NFT buyer). If initially, Sam has divided the NFT into five equal portions, which is represented by the share quantity of five and Sam distributed two such shares to Tom and one to Sally, then the NFT is now owned by three people (Sam—2 shares, Tom—2 shares, and Sally—1 share). This means Sam owns 40% of the NFT, Tom owns other 40%, and Harry owns 20% of the NFT.

Sam, Tom, or Sally can further transfer shares to other NFT buyers. Any user owning the token can burn their respective shares. For example, Sam can burn one or more of his shares and create scarcity to increase demand. During the minting of tokens, the token quantity can be fractional in nature.

After the generated token project is deployed, the Token Admins and Token Owners follow a flow for creating tokens and completing lifecycle operations. When a project is deployed, a list of users (using their user IDs and organization IDs) can be passed as parameters to the initialization method. These users become first "Token Admins" of the deployed chaincode.

The flow for creating tokens and completing lifecycle operations follows these steps:

Token Admin Operations:

Create user accounts for anyone who possesses tokens or complete token-related operations.

For each user account, create token accounts. Users have only one non-fungible token (NFT) account and can have many fungible token accounts (in case the user wants to create fungible tokens too).

Create NFT with metadata and quantity.

Token Owner Operations:

Users who have the minter role for a specific token can mint/add additional quantity to the NFT.

Users can transfer shares/portions of tokens to other users, and check balances.

Users who have the burner role for a specific token can destroy (burn) some/all portions of the NFT. If the user has burned all his shares/portions of the NFT, he is no longer the owner of that NFT.

Data Model

Assets are modelled as individual classes that follow the Model-Controller pattern. Users simply need to specify the properties of the asset and all the operations on the asset are managed by the Core SDK. This provides a simpler way for the user to create the application and focus on only the business logic. In the case of Tokenization, the framework uses Account-Balance Model to represent tokenized assets as balances within an account. These accounts are similar to bank accounts, where each account experiences direct deposit and transfer with state transitions.

The advantage of Account-Balance model are as follows: simplicity and flexibility of its use; efficiency, as each transaction only needs to validate that the sending account has enough balance to pay for the transaction; smaller transaction sizes; ability of users to own multiple tokens of different type; and report generation based on account transaction history. The disadvantage is because the result of a transaction depends on the input state, care must be taken when executing transactions in parallel. Generally, transactions affecting the same account will need to be executed one after another, otherwise this will result in commit errors during blockchain commit validation, but this is not practical for production purposes. Oracle has implemented a feature called "MVCC Optimisation," which can be enabled from App Builder generated chaincodes. This allows chaincode data models to rely on token balances but still support high transaction throughputs.

Accounts

An account is created for every user who will have tokens at any given point of time in the network. For fungible tokens (FTs), the account will be used to track the user's balance and on-hold balance. And for the Non-Fungible Tokens (NFTs), the account is used to store the count of NFTs held by the user at any point of time. Users must have accounts in the network to complete token-related operations.

FIG. 7 is a flowchart illustrating a process flow for account creation in accordance with an embodiment. Operation begins when a caller initiates the creation of an account (block 700). The process determines whether the caller is an administrator (block 701). If the caller is not an administrator (block 701: No), then the process throws an error (block 702), and operation ends (block 703). If the caller is an administrator (block 701: Yes), then the process reads the user ID, organization ID, and account type for the account being created (block 704). The process then validates the user ID, organization ID, and account type (block 705). If validation fails (block 705: Fail), then the process throws an error (block 702), and operation ends (block 703).

If validation passes (block 705: Pass), then the process generates a the user account ID, using user ID, organization ID, and user account as parameters (block 706). The process then determines whether the user account ID already exists (block 707). If the user account ID already exists (block 707: Yes), then the process throws an error (block 702), and operation ends (block 703).

If the user account ID does not already exist (block 707: No), then the process creates the user account (block 708). The process determines whether the account type is NFT (block 709). If the account type is not NFT (block 709: No), then the process performs a process to create a fungible token account (block 710). If the account type is NFT (block 709: Yes), then the process determines whether the user account's associated NFT account exists (block 711). If the user account's associated NFT account exists (block 711: Yes), then the process throws an error (block 702), and operation ends (block 703).

If the user account's associated NFT account does not exist (block 711: No), then the process generates an NFT account, using the user ID, organization ID, and NFT account as parameters (block 712). Then, the process saves the NFT account (block 713) and saves the user account (block 714). Thereafter, operation ends (block 703).

FIG. 8 illustrates user account key/value pair for tracking fungible and non-fungible token accounts for a user in accordance with an embodiment. The value of 'accountId' is the key; it is unique for every user in the system. In one embodiment, 'accountId' is the SHA-256 hash of the orgId and userId with certain prefixes or suffixes. This is used to store all the account keys of any user as given by the userId (username or email of the user) and orgId (organisation MSPid). The 'totalAccounts' property holds the total count of all the accounts for this user. The 'totalFtAccounts' property stores the total count of all the FT accounts. This is so the user can create FT accounts and associate them with tokens at a later stage. Every FT or NFT token account must be associated with a token. This detail is stored in the 'associatedFtAccounts' and 'associatedNftAccount,' respectively. The user can have multiple FT accounts but only one NFT account.

FIG. 9 illustrates NFT account key/value pair for tracking the non-fungible tokens of a user in accordance with an embodiment. The 'noOfNfts' property stores the count of all the NFTs. This property is flagged for MVCC optimization, this helps in preventing errors when concurrent transactions (updating the same key) are involved in the same block and thereby increases the throughput of transactions.

In accordance with the 'roles' token behavior, a user can add any roles, such as 'minter' or 'burner,' to any 'accountId.' With this privilege, a user can mint an NFT or burn some or all the user's shares of the NFT.

Create Token

Figure 10A:
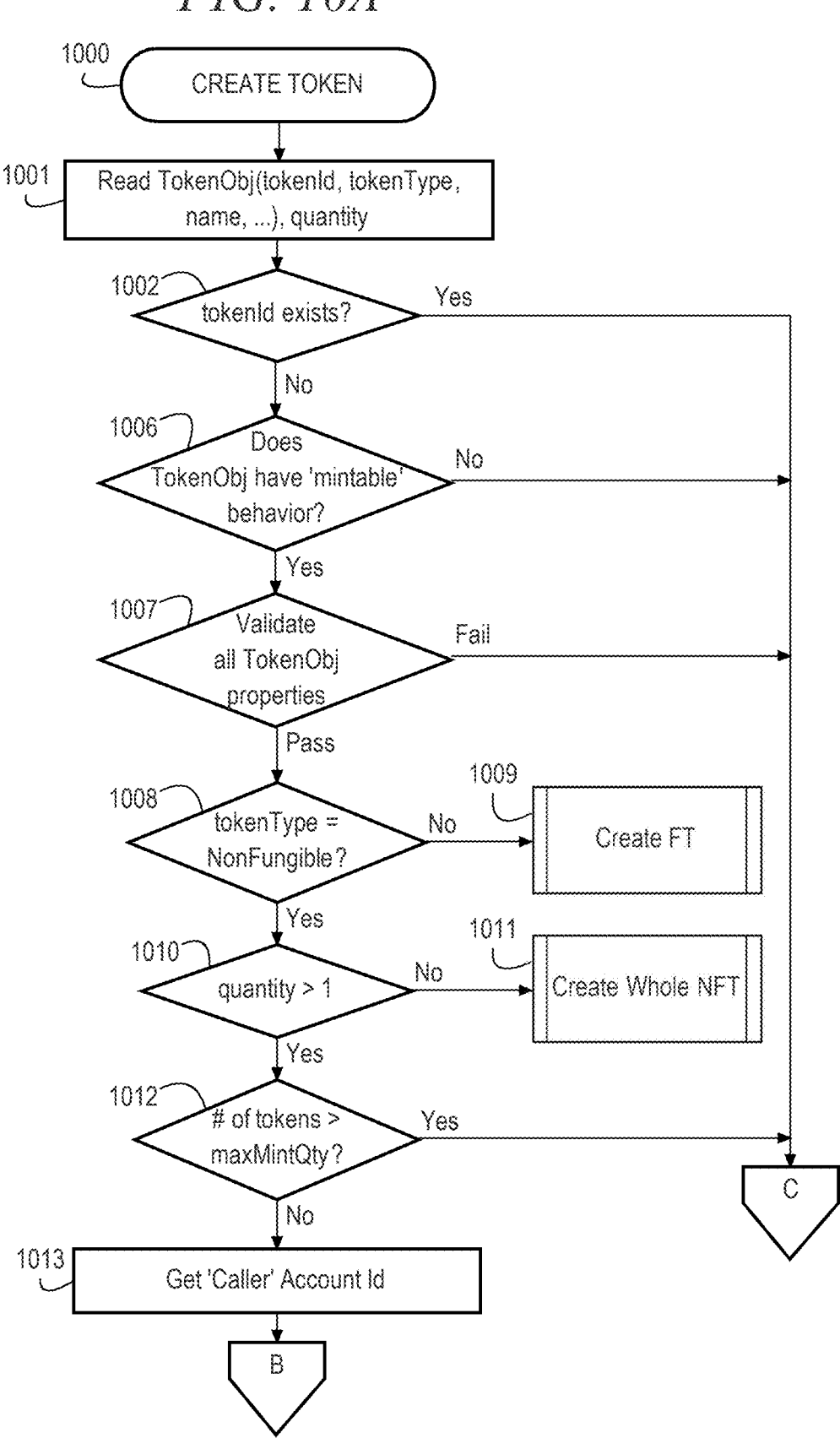
FIGS. 10A and 10B are continuous portions of a flowchart illustrating a process flow for token creation in accordance with an embodiment.
Figure 10B:
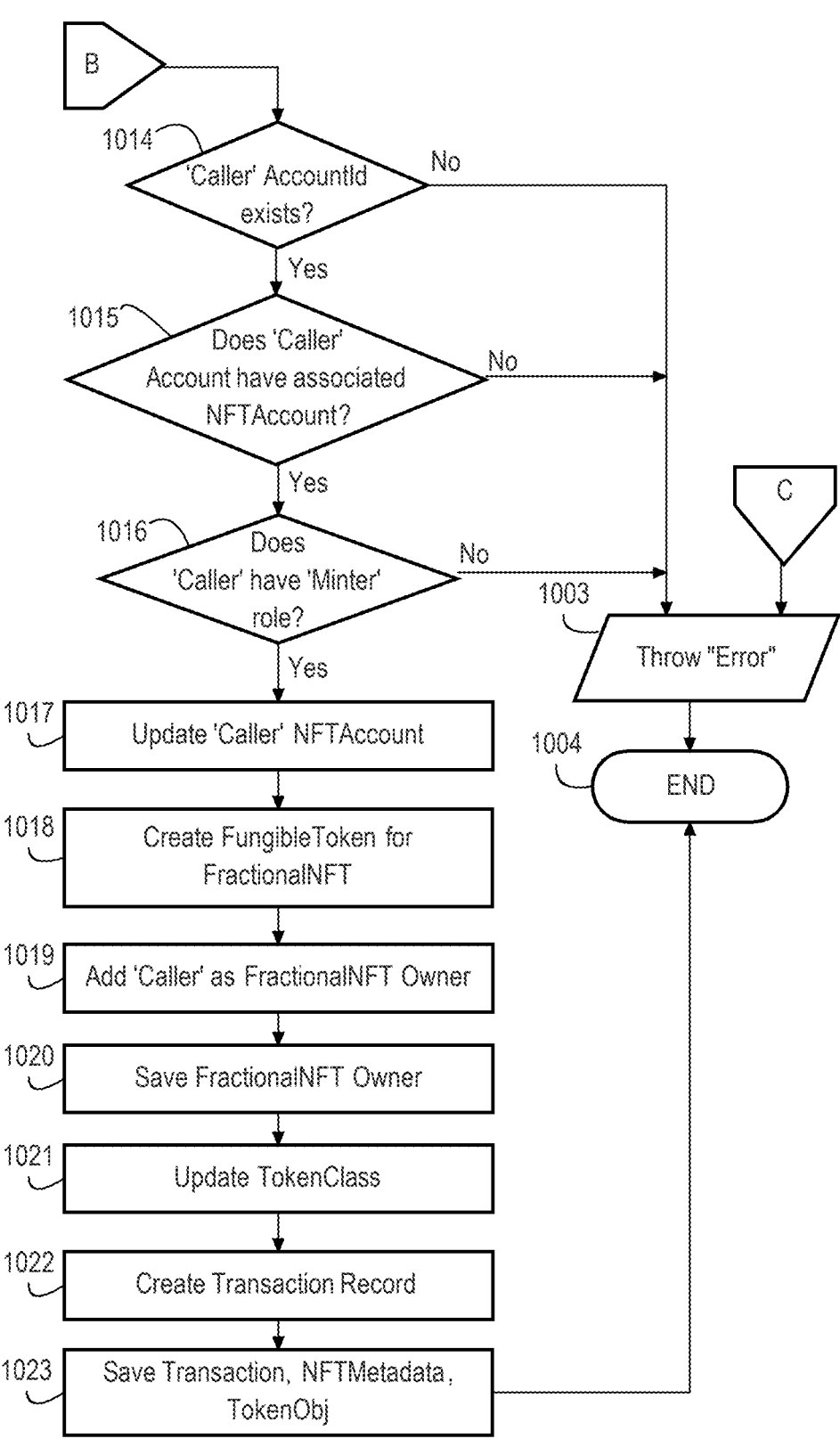

FIGS. 10A and 10B are continuous portions of a flowchart illustrating a process flow for token creation in accordance with an embodiment. With reference to FIG. 10A, operation begins when a user initiates creation of a token (block 1000). The process reads the token object and quantity of shares of the token object (block 1001). The process determines whether the token ID already exists (block 1002). If the token ID exists (block 1002: Yes), then operation proceeds to FIG. 10B, and the process throws an error (block 103), and operation ends (block 1004).

Returning to FIG. 10A, if the token ID does not exist (block 1002: No), then the process determines whether the token object has a 'mintable' behavior (block 1006). If the token object does not have a 'mintable' behavior (block 1006: No), then operation proceeds to FIG. 10B, and the process throws an error (block 103), and operation ends (block 1004). If the token object does have a 'mintable' behavior (block 1006: Yes), then the process validates all token object properties (block 1007). If validation fails (block 1007: Fail), then the process throws an error (block 103), and operation ends (block 1004).

If validation passes (block 1007: Pass), then the process determines whether the token type is non-fungible (block 1008). If the token type is not non-fungible (block 1008: No), then the process performs a process to create a fungible token (block 1009). If the token type is non-fungible (block 1008: Yes), then the process determines whether the quantity is greater than one (block 1010). If the quantity is not greater than one (block 1010: No), then the process performs a process to create a whole NFT (block 1011). In an alternative embodiment, the process may generate a fractional NFT with the ability to be re-minted with a quantity that is greater than one.

If the quantity is greater than one (block 1010: Yes), then the process determines whether the number of tokens in the NFT group minted up to the current time is greater than a maximum mint quantity (block 1012). If the number of tokens in the NFT group is greater than the maximum mint quantity (block 1012: Yes), then operation proceeds to FIG. 10B, and the process throws an error (block 103), and operation ends (block 1004).

If the number of tokens in the NFT group minted up to the current time is not greater than the maximum mint quantity (block 1012: No), then the process gets the caller account ID (block 1013). Then, operation proceeds to FIG. 10B. The process determines whether the caller account ID already exists (block 1014). If the caller account ID does not exist (block 1014: No), then the process throws an error (block 103), and operation ends (block 1004).

If the caller account ID exists (block 1014: Yes), then the process determines whether the caller account has an associated NFT account (block 1015). If the caller account does not have an associated NFT account (block 1015: No), then the process throws an error (block 1003), and operation ends (block 1004). If the caller account has an associated NFT account (block 1015: Yes), then the process determines whether the caller has the 'minter' role (block 1016). If the caller does not have the 'minter' role (block 1016: No), then the process throws an error (block 103), and operation ends (block 1004).

If the caller has the 'minter' role (block 1016: Yes), then the process updates the caller NFT account (block 1017). The process creates a fungible token for the fractional NFT (block 1018). The process adds the caller as a fractional NFT owner (block 1019) and saves the fractional NFT owner (block 1020). The process then updates the token class (block 1021), creates a transaction record (block 1022), and saves the transaction, the NFT metadata, and the token object (block 1023). Thereafter, operation ends (block 1004).

FIG. 11 illustrates non-fungible token key/value pair for tracking a non-fungible token in accordance with an embodiment. More specifically, FIG. 11 illustrates key/value (K/V) pairs that are created in a state database (stateDB) with relation to NFT creation. The NFT key is identified by 'tokenId.' A set of properties are saved that describe the type and behaviors of the token, such as 'tokenName,' 'tokenDesc,' 'tokenStandard,' 'tokenType,' 'tokenUnit,' 'behaviors,' and corresponding behavioral properties like 'roles,' 'mintable,' 'divisible,' etc. The 'createdBy' property stores the 'accountId' of the caller, who is the user minting the token. The 'creationDate' property is the timestamp of the minting transaction. The 'isBurned' property indicates whether the token is burned. The 'tokenUri' property stores the URI of the NFT.

In FIG. 11, the 'quantity' property indicates the total number of shares or fractions of the token that can be owned by users. For a whole NFT, the 'quantity' is 1, and for a fractional NFT, the 'quantity' is more than 1. When the NFT is created, all shares are owned by the creating user. The number of shares is fixed unless the NFT is reminted, as will be described in further detail below.

The metadata of the NFT is stored as an embedded asset. The user can specify any number of custom properties for the NFT. In this case, 'price' and 'onSaleFlag' are stored as custom property in stateDB. Certain properties like 'createdBy,' 'creationDate,' 'isBurned,' 'tokenUri,' the metadata, etc. cannot be edited once the corresponding transaction has set its value. When updating the token, the user can only update certain properties 'tokenDesc,' user created custom properties, etc.

FIG. 12 illustrates non-fungible token metadata key/value pair in accordance with an embodiment. As a part of the token creation process, certain information is stored in the stateDB, such as the 'NftMetadata' key/value pair shown in FIG. 12. This is used to record if a particular token has been instantiated or not. This can be used later for reports and other get operations.

FIG. 13 illustrates non-fungible token class key/value pair in accordance with an embodiment. The blockchain platform can quantify an entire class of NFTs by storing the total number of tokens minted or currently in the system (after burn) using the key/value pair shown in FIG. 13. This helps in some analytical operations.

FIG. 14 illustrates a composite key for storing owners of a fractional NFT in accordance with an embodiment. The owner(s) of a fractional NFT are stored as a composite key as shown in FIG. 14. A user can fetch the owners of a fractional NFT by making queries on the composite key. This is also used to avoid key conflicts or commit time errors ('MVCC_READ_CONFLICT' errors), as the current Oracle MVCC optimization works only on numeric data types.

The shares of the NFT that are owned by the owners of the NFT are stored in an internal fungible token account. This is because the standard ERC1155, which is extended by aspects of the embodiments described herein, can have both FTs and NFTs in a single chaincode. When a fractional NFT is divided into several shares (the total of which is stored in the 'quantity' property of the NFT key/value pair as seen above), the individual shares that are owned by various owners are stored in the internal fungible account of all those owners. The combination of both FT and NFT is instrumental in the creation and maintenance of this fractional NFT.

FIG. 15 illustrates a fungible non-fungible token key/value pair for shares of a fractional NFT in accordance with an embodiment. Because the shares are represented as fungible tokens and stored in a fungible token account, a corresponding FT object is created, as shown in FIG. 15. The key 'tokenId' is concatenation of the <tokenId> of the F-NFT and '_onfft' as the suffix. The 'tokenType' is fungible, to indicate that this is a new type of fungible token created internally. The foreign key 'parentFractionalNft' maintains the relationship between the parent fractional NFT and the child FT.

The above created FT for the fractional NFT and its shares are stored in an internal fungible token account. FIG. 16 illustrates a fungible NFT account key/value pair for tracking ownership of shares of a fractional NFT in accordance with an embodiment. The 'balance' property holds the individual shares of a user. This property is also flagged for MVCC optimization.

FIG. 17 illustrates user accounts update in accordance with an embodiment. FIG. 18 illustrates token account update in accordance with an embodiment. In the token creation process, the corresponding user accounts and token account are updated as shown in FIGS. 17 and 18. FIG. 19 illustrates a transaction key/value pair for recording transaction details in the state database in accordance with an embodiment. Whenever a transaction is executed, a corresponding record of the transaction details is stored in the stateDB. This is used to generate reports and account or transaction history. Sometimes a transaction can be triggered by a caller other than 'from' or 'to' party.

Transfer

Figure 20A:
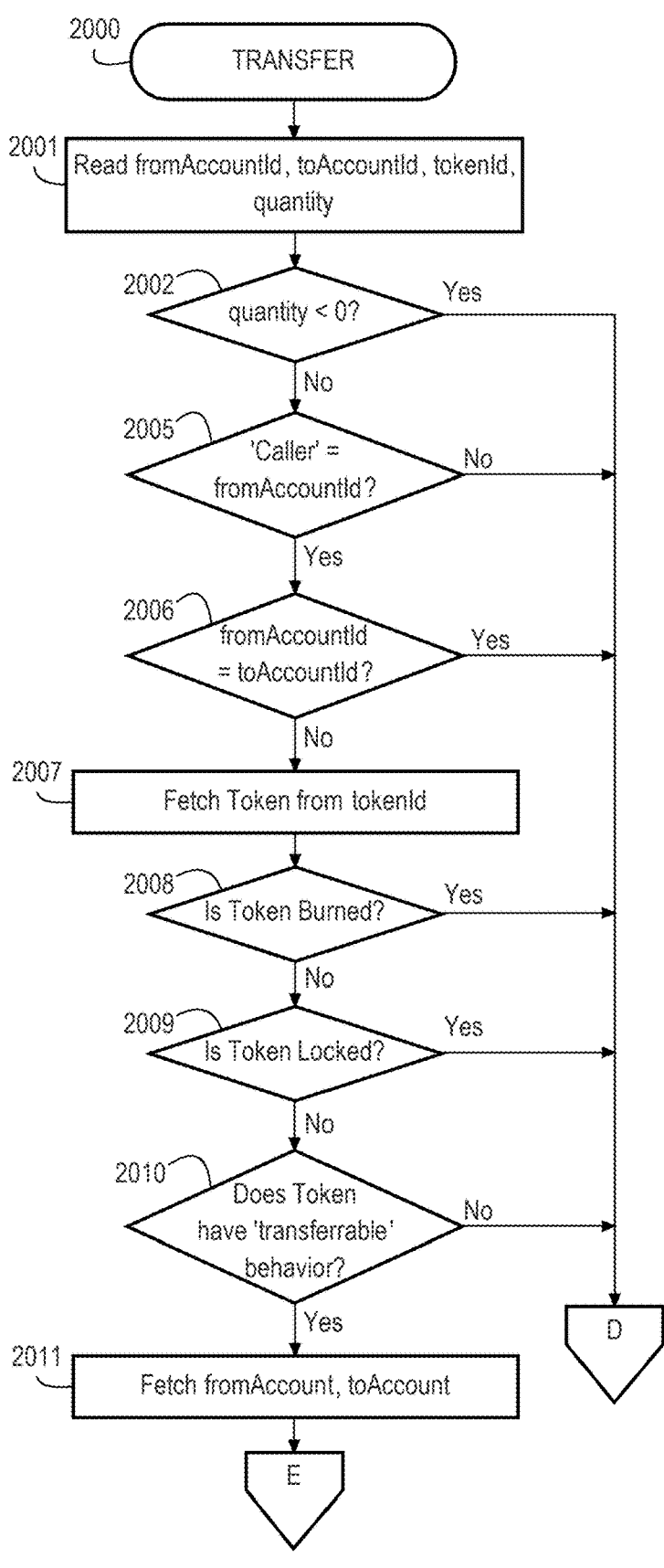
FIGS. 20A-20C are continuous portions of a flowchart illustrating a process flow for token transfer in accordance with an embodiment.
Figure 20B:
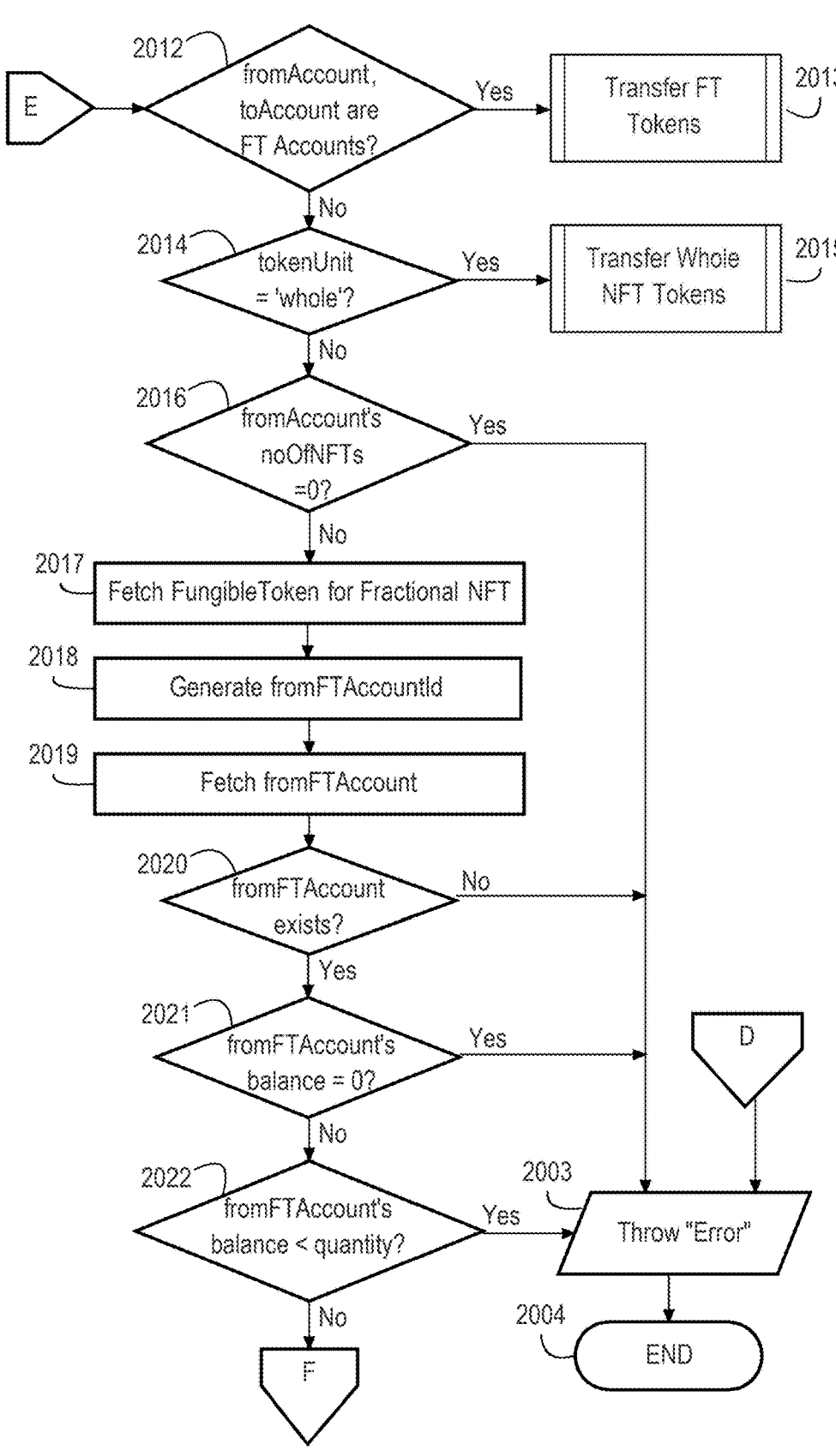
Figure 20C:
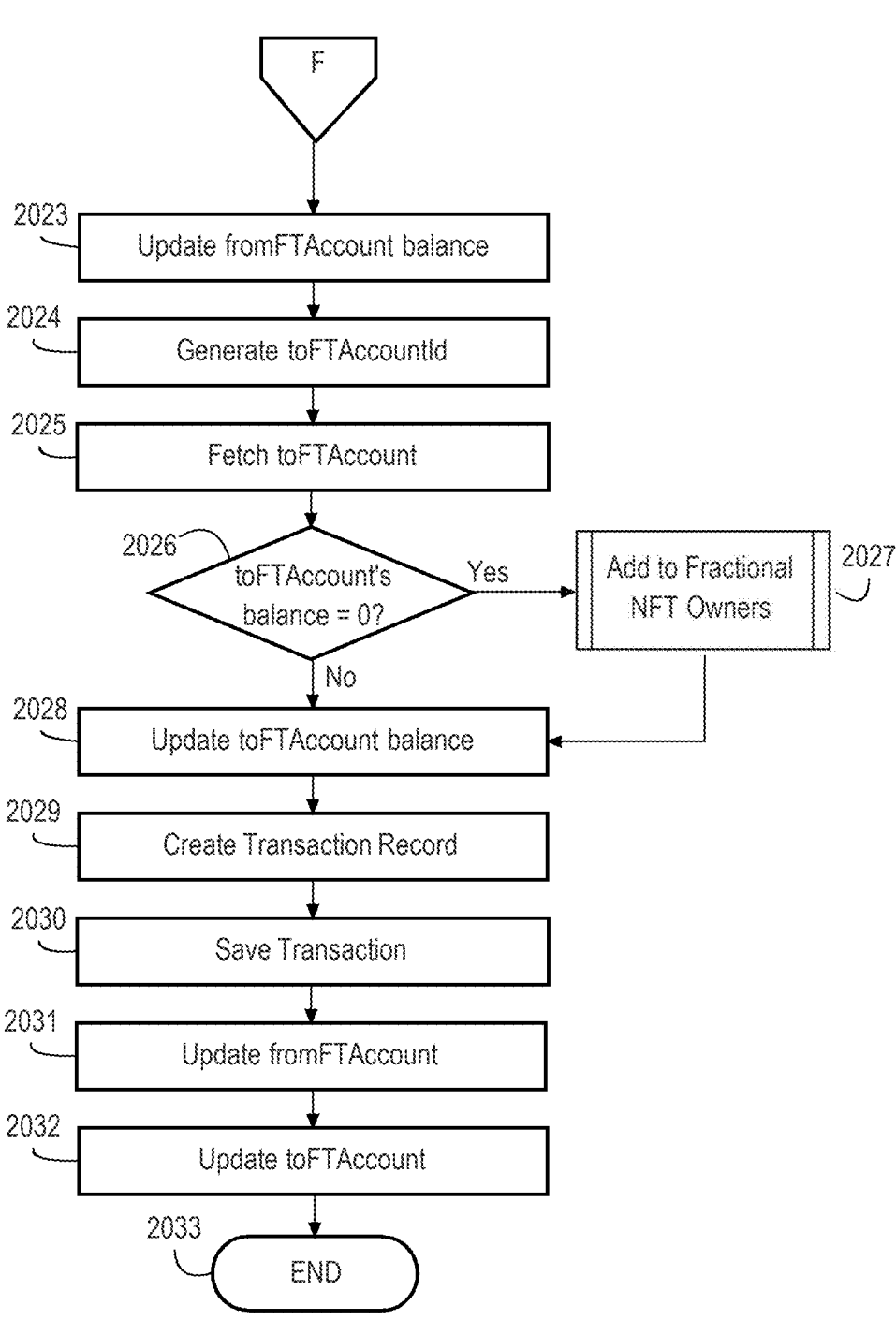

FIGS. 20A-20C are continuous portions of a flowchart illustrating a process flow for token transfer in accordance with an embodiment. With reference to FIG. 20A, operation begins when a caller initiates transfer of a token from one user to another (block 2000). The process reads the "from" account ID, the "to" account ID, the token ID, and the quantity being transferred (block 2001). The "from" user is transferring a quantity of a token to the "to" user. The process determines whether the quantity is less than zero (block 2002). If the quantity is less than zero (block 2002: Yes), then operation proceeds to FIG. 20B, the process throws an error (block 2003), and operation ends (block 2004).

If the quantity is not less than zero (block 2002: No), then the process determines whether the caller is the from account ID (block 2005). If the caller is not the from account ID (block 2005: No), then operation proceeds to FIG. 20B, the process throws an error (block 2003), and operation ends (block 2004).

If the caller is the "from" account ID (block 2005: Yes), then the process determines whether the "from" account ID is equal to the "to" account ID (block 2006). If the "from" account ID is equal to the "to" account ID (block 2006: Yes), the operation proceeds to FIG. 20B, the process throws an error (block 2003), and operation ends (block 2004).

If the "from" account ID is not equal to the "to" account ID (block 2006: No), then the process fetches the token from the token ID (block 2007). The process then determines whether the token is burned (block 2008). Whether token is burned or not is recorded in an 'isBurned' property of the token. If the token is burned (block 2008: Yes), then operation proceeds to FIG. 20B, the process throws an error (block 2003), and operation ends (block 2004). If the token is not burned (block 2008: No), then the process determines whether the token is locked (block 2009). If the token is locked (block 2009: Yes), then operation proceeds to FIG. 20B, the process throws an error (block 2003), and operation ends (block 2004). If the token is not locked (block 2009: No), then the process determines whether the token has 'transferable' behavior (block 2010). If the token does not have 'transferrable' behavior (block 2010: No), then operation proceeds to FIG. 20B, the process throws an error (block 2003), and operation ends (block 2004).

If the token has 'transferrable' behavior (block 2010: Yes), then the process fetches the from account and the to account (block 2011). Then, operation proceeds to FIG. 20B. The process determines whether the "from" account and the "to" accounts are fungible token accounts (block 2012). If the "from" account and the "to" account are FT accounts (block 2012: Yes), then the process performs a process for transfer of FT tokens (block 2013). If the "from" account and the "to" account are not FT accounts (block 2012: No), then the process determines whether the token unit is 'whole' (block 2014). If the token unit is 'whole' (block 2014: Yes), then the process performs a process for transfer of whole NFT tokens (block 2015).

If the token unit is not 'whole' (block 2014: No), then the process determines whether the "from" account's number of NFTs is equal to zero (block 2016). If the "from" account's number of NFTs is equal to zero (block 2016: Yes), then the process throws an error (block 2003), and operation ends (block 2004).

If the "from" account's number of NFTs is not equal to zero (block 2016: No), then the process fetches the fungible token for the fractional NFT (block 2017). The process generates the "from" FT account ID (block 2018) and fetches the "from" FT account (block 2019). The process determines whether the "from" FT account exists (block 2020). If the "from" FT account does not exist (block 2020: No), then the process throws an error (block 2003), and operation ends (block 2004).

If the "from" FT account exists (block 2020: Yes), then the process determines whether the "from" FT account's balance is zero (block 2021). The user cannot transfer shares that the user does not own. If the "from" FT accounts' balance is zero (block 2021: Yes), then the process throws an error (block 2003), and operation ends (block 2004). If the "from" FT account's balance is not zero (block 2021: No), then the process determines whether the "from" FT account's balance is less than the quantity to be transferred (block 2022). Again, the user cannot transfer shares the user does not own. If the "from" FT accounts' balance is less than the quantity to be transferred (block 2022: Yes), then the process throws an error (block 2003), and operation ends (block 2004).

If the "from" FT account's balance is not less than the quantity to be transferred (block 2022: No), then operation proceeds to FIG. 20C. The process updates the "from" FT account balance (block 2023). The process generates the "to" FT account ID (block 2024) and fetches the "to" FT account (block 2025). The process then determines whether the "to" FT account's balance is zero (block 2026). If the "to" FT account's balance is zero (block 2026), then the process performs a process for adding the "to" account to the fractional NFT owners (block 2027). Thereafter, or if the "to" FT account's balance is not zero (block 2026: No), then the process updates the "to" FT account balance (block 2028).

The process creates a transaction record (block 209) and saves the transaction (block 2030). The process updates the "from" FT account (block 2031) and updates the "to" FT account (block 2032). Thereafter, operation ends (block 2033).

Any user who owns one or many shares of the NFT can transfer some or all of his shares to another user. App Builder uses the ERC1155 standard batch methods to transfer a batch of tokens (FTs or NFTs) from one user to another. In use case described above, Sam can transfer two of his token portions to Tom. FIG. 21 illustrates an internal fungible NFT account update for a user transferring shares of a fractional NFT in accordance with an embodiment. The balance of Sam's internal FT account is updated with this change by his balance being reduced to 3.

FIG. 22 illustrates an NFT account update for a share transfer in accordance with an embodiment. The corresponding internal FT account will be created for Tom to hold the shares of this fractional NFT. Tom is now the new owner of this Fractional NFT. This is done by updating the count of NFTs hold by Tom NFT account and creating new owner composite key. FIG. 23 illustrates creation of an internal fungible NFT account for a user receiving transfer of shares of a fractional NFT in accordance with an embodiment.

FIG. 24 illustrates a composite key for a new owner of shares of a fractional NFT in accordance with an embodiment. A composite key for the new owner Tom is created. Similarly, Sam can transfer one more share of the NFT to Sally. The transactions key/value pairs are created for all such transfer operations. If a user does a complete transfer of all the user's shares of the NFT, then once the transfer is completed, the user is no longer an owner of that particular NFT.

Multiple Mint

A user can mint a fractional NFT again. This means that the user can increase the total shares/quantity of the F-NFT. An example scenario where one may need to increase the total shares of an F-NFT includes Intellectual Property (IP) sharing. In this case, the creator of the NFT may encounter a need to increase the shares of the F-NFT representing ownership of the IP with an increase in demand for that IP. There could be other use cases as well. This can be done by calling the 'mintBatch' API. This method can only be invoked by the token creator who also has the minter role and currently owns some or all portions of the NFT.

Figure 25B:
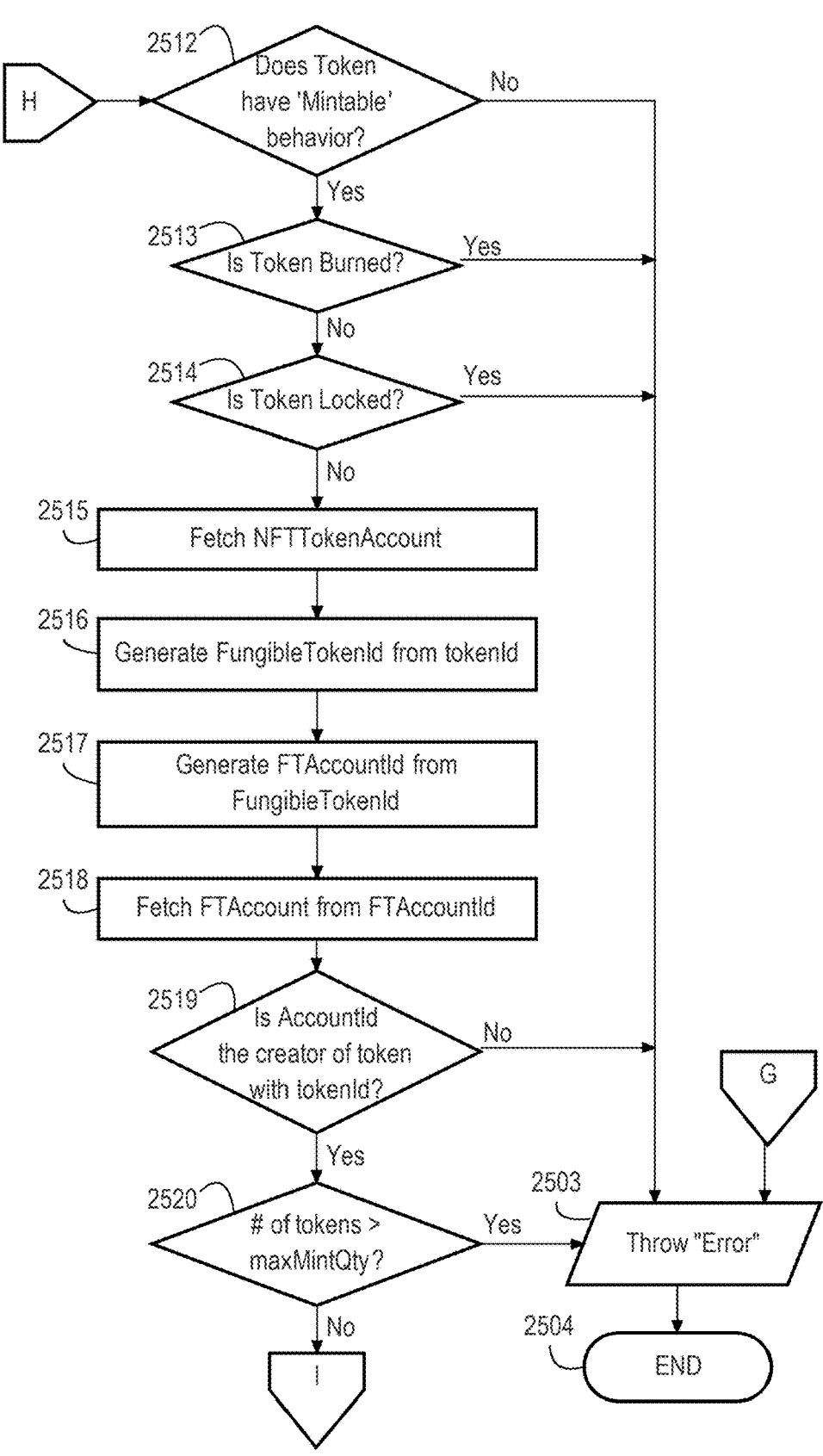
Figure 25C:
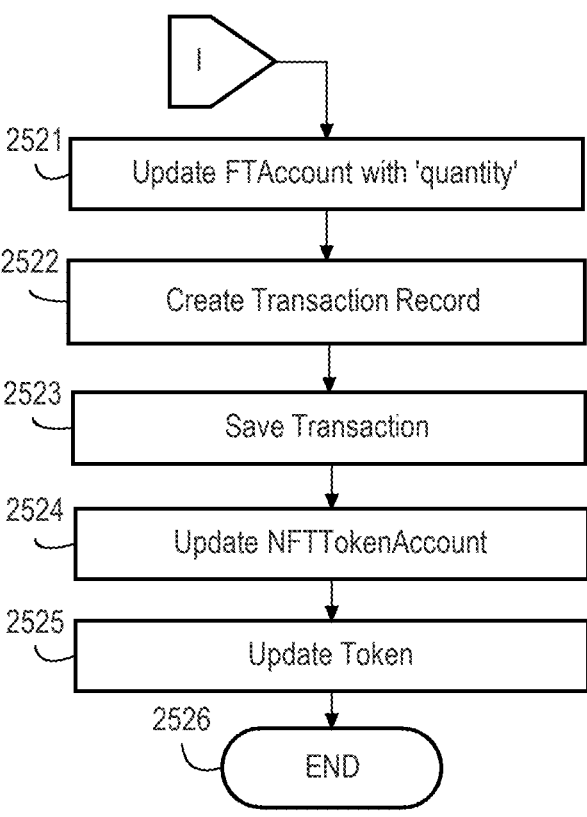

FIGS. 25A-25C are continuous portions of a flowchart illustrating a process flow for multiple minting of a fractional NFT in accordance with an embodiment. Operation begins when a user initiates a re-mint of an F-NFT (block 2500). The process reads the account ID, token ID, and quantity (block 2501). The process determines whether the account ID exists (block 2502). If the account ID does not exist (block 2502: No), then operation proceeds to FIG. 25B, the process throws an error (block 2503), and operation ends (block 2504).

If the account ID exists (block 2502: Yes), then the process gets the caller account ID (block 2505). The process determines whether the account ID is the caller account ID (block 2506). If the account ID is not the caller account ID (block 2506: No), then operation proceeds to FIG. 25B, the process throws an error (block 2503), and operation ends (block 2504).

If the account ID is equal to the caller account ID (block 2506: Yes), then the process determines whether the caller has the 'minter' role (block 2507). If the caller does not have the 'minter' role (bock 2507: No), then operation proceeds to FIG. 25B, the process throws an error (block 2503), and operation ends (block 2504).

If the caller has the 'minter' role (block 2507: Yes), then the process determines whether the account's total account (the number of token accounts of the user) is zero (block 2508). If the account's total account value is zero (block 2508: Yes), then operation proceeds to FIG. 25B, the process throws an error (block 2503), and operation ends (block 2504).

If the account's total account value is not equal to zero (block 2508: No), then the process fetches the token from the token ID (block 2509). The process determines whether the token is non-fungible (block 25010). If the token is not non-fungible (block 2510: No), then the process performs a process for minting a fungible token (block 2511). If the token is non-fungible (block 2510: Yes), then operation proceeds to FIG. 25B. The process determines whether the token has 'mintable' behavior (block 2512). If the token does not have 'mintable' behavior (block 2512: No), then the process throws an error (block 2503), and operation ends (block 2504).

If the token has 'mintable' behavior (block 2512: Yes), then the process determines whether the token is burned (block 2513). If the token is burned (block 2513: Yes), then the process throws an error (block 2503), and operation ends (block 2504). If the process is not burned (block 2513: No), then the process determines whether the token is locked (block 2514). If the token is locked (block 2514: Yes), then the process throws an error (block 2503), and operation ends (block 2504).

If the token is not locked (block 2514: No), then the process fetches the NFT token account (block 2515) and generates a fungible token ID from the token ID (block 2516). The process generates an FT account ID from the fungible token ID (block 2517) and fetches the FT account from the FT account ID (block 2518). The process then determines whether the account ID is the creator of the token with the token ID (block 2519). If the account ID is not the creator of the token (block 2519: No), then the process throws an error (block 2503), and operation ends (block 2504). If the account ID is the creator of the token (block 2519: Yes), then the process determines whether the number of tokens created in the NFT group up to the current time is greater than the maximum mint quantity (block 2520). If the number of tokens in the NFT group is greater than the maximum mint quantity (block 2520: Yes), then the process throws an error (block 2503), and operation ends (block 2504).

If the number of tokens in the NFT group is not greater than the maximum mint quantity (block 2520: No), then operation proceeds to FIG. 25C. The process updates the FT account with the quantity (block 2521). The process creates a transaction record (block 2522) and saves the transaction (block 2523). The process updates the NFT token account (bock 2524) and updates the token with the updated quantity (block 2525). Thereafter, operation ends (block 2526).

After the two transfers described above with reference to the example use case, Sam only owns two shares of the NFT. Because he is the creator of the NFT, he can create/mint more shares of the NFT to sell to more users. FIG. 26 illustrates an update to the internal FT account of the creator after re-minting a fractional NFT in accordance with an embodiment. FIG. 27 illustrates an update to the NFT after re-minting the fractional NFT in accordance with an embodiment. If Sam mints two more portions, then his balance will change to 4 (which means he now owns 4 shares of the NFT) and the total 'quantity' of the NFT will become 7.

The above implementation can be extended to restrict the minting of additional portions/shares to only the minter of the NFT without increasing the total quantity of the NFT. With the above flexible design, other enhancements can be possible.

Burn

Using the 'burnBatch' API, owners can burn a share of an F-NFT. If the 'burner' role is specified in the 'behaviors' of the token, then users with the 'burner' role privilege can only burn some or all portions of the user's NFT. If no burner role is specified, then all owners can burn their own portion of the NFT.

Figure 28A:
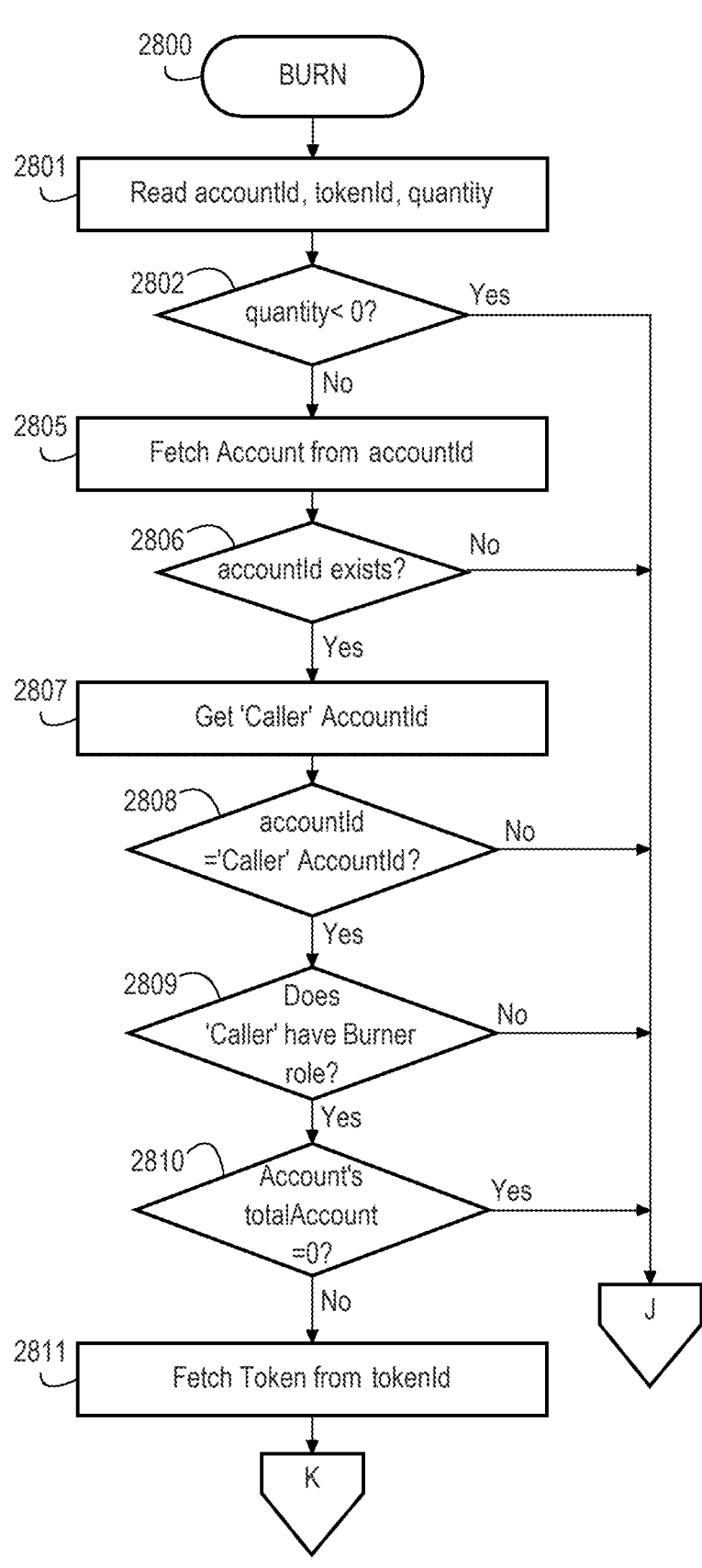
FIGS. 28A-28C are continuous portions of a flowchart of a process flow for burning a share of a fractional NFT in accordance with an embodiment.
Figure 28B:
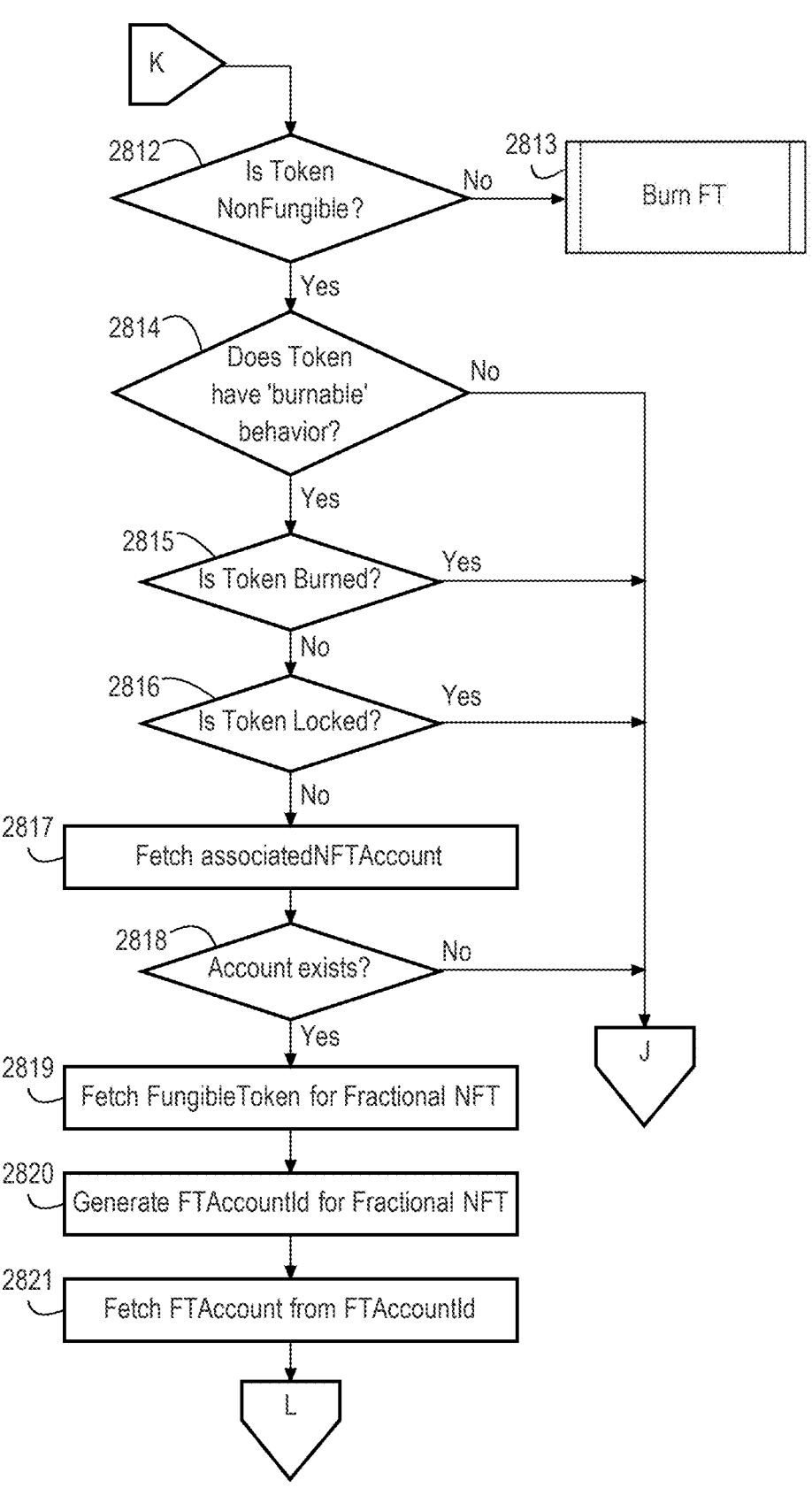
Figure 28C:
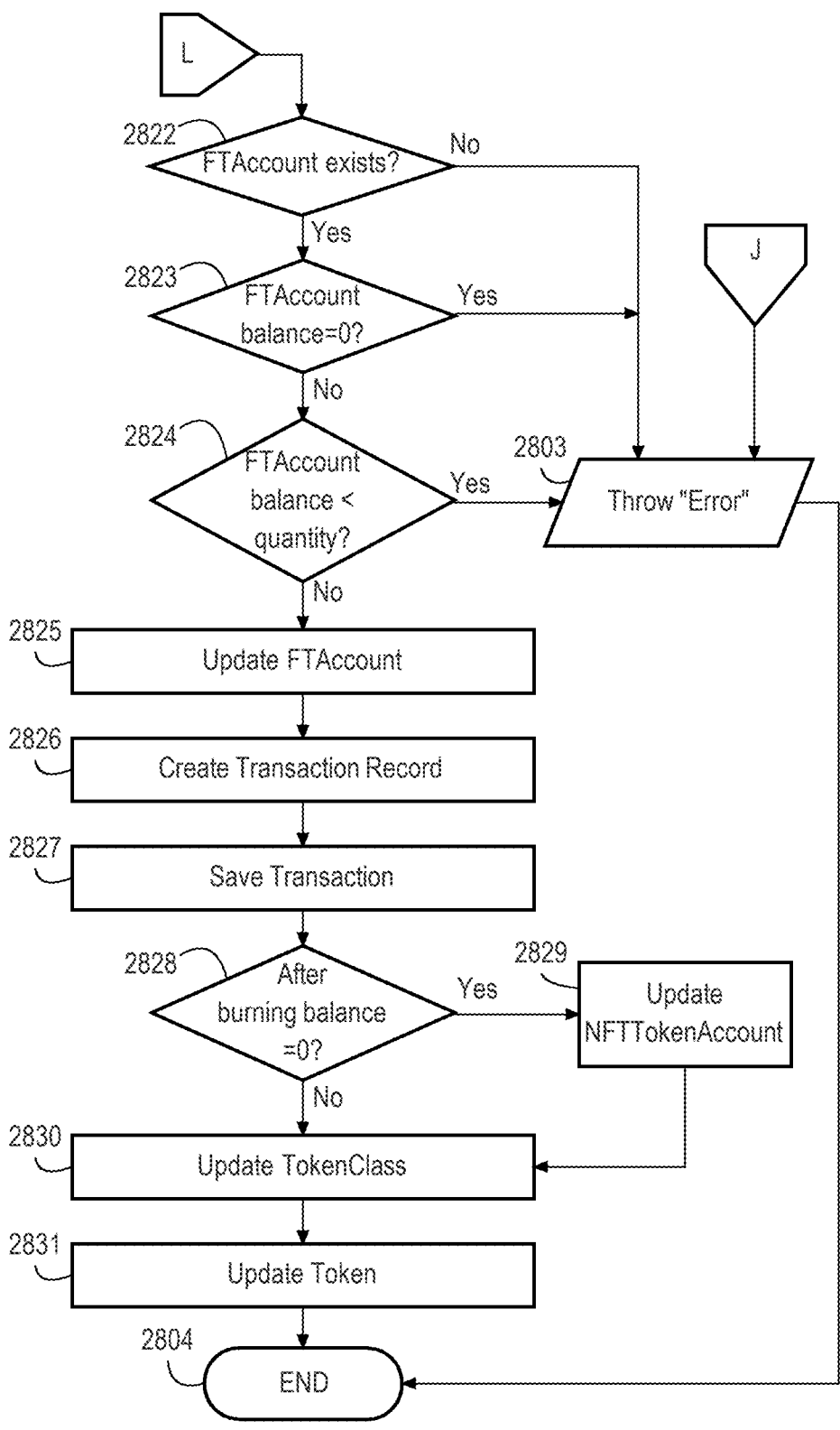

FIGS. 28A-28C are continuous portions of a flowchart of a process flow for burning a share of a fractional NFT in accordance with an embodiment. Operation begins when a user initiates burn of a quantity of shares of a fractional NFT (block 2800). The process reads the account ID of the user, token ID of the F-NFT, and quantity of shares to be burned (block 2801). The process determines whether the quantity is less than zero (block 2802). If the quantity is less than zero (block 2802: Yes), then operation proceeds to FIG. 28C, the process throws an error (block 2803), and operation ends (block 2804).

Returning to FIG. 28A, if the quantity is not less than zero (block 2802: No), then the process fetches the account from the account ID (block 2805). The process determines whether the account ID exists (block 2806). If the account ID does not exist (block 2806: No), then operation proceeds to FIG. 28C, the process throws an error (block 2803), and operation ends (block 2804).

If the account ID exists (block 2806: Yes), then the process gets the caller account ID (block 2807). The process determines whether the account ID is equal to the caller account ID (block 2808). If the account ID is not the caller account ID (block 2808: No), then operation proceeds to FIG. 28C, the process throws an error (block 2803), and operation ends (block 2804).

If the account ID is equal to the caller account ID (block 2808: Yes), then the process determines whether the caller has the 'burner' role (block 2809). If the caller does not have the 'burner' role (block 2809: No), then operation proceeds to FIG. 28C, the process throws an error (block 2803), and operation ends (block 2804).

If the caller has the 'burner' role (block 2809: Yes), then the process determines whether the account's total account value (the number of token accounts of the user) is equal to zero (block 2810). If the accounts' total account value is equal to zero (block 2810: Yes), then operation proceeds to FIG. 28C, the process throws an error (block 2803), and operation ends (block 2804).

If the account's total account value is not equal to zero, then the process fetches the token from the token ID (block 2811), and operation proceeds to FIG. 28B. The process determines whether the token is non-fungible (block 2812). If the token is not non-fungible (block 2812: No), then the process performs a process to burn the fungible token (block 2813).

If the token is non-fungible (block 2812: Yes), then the process determines whether the token has 'burnable' behavior (block 2814). If the token does not have 'burnable' behavior (block 2814: No), then operation proceeds to FIG. 28C, the process throws an error (block 2803), and operation ends (block 2804).

If the token has 'burnable' behavior (block 2814), then the process determines whether the token is burned (block 2815). If the token is burned (block 2815: Yes), then operation proceeds to FIG. 28C, the process throws an error (block 2803), and operation ends (block 2804). If the token is not burned (block 2815: No), then the process determines whether the token is locked (block 2816). If the token is locked (block 2816: Yes), then operation proceeds to FIG. 28C, the process throws an error (block 2803), and operation ends (block 2804).

If the token is not locked (block 2816: No), then the process fetches the associated NFT account (block 2817). The process determines whether the account exists (block 2818). If the account does not exist (block 2817: No), then operation proceeds to FIG. 28C, the process throws an error (block 2803), and operation ends (block 2804).

If the account exists (block 2818: Yes), then the process fetches the fungible token for the fractional NFT (block 2819). The process generates an FT account ID for the fractional NFT (block 2820) and fetches the FT account from the FT account ID (block 2821). Thereafter, operation proceeds to FIG. 28C. The process determines whether the FT account exists (block 2822). If the FT account does not exist (block 2822: No), then the process throws an error (block 2803), and operation ends (block 2804). If the account exists (block 2822: Yes), then the process determines whether the FT account balance is equal to zero (block 2823). A user cannot burn shares that the user does not own. If the FT account balance is zero (block 2823: Yes), then the process throws an error (block 2803), and operation ends (block 2804).

If the FT account balance is not zero (block 2823: No), then the process determines whether the FT account balance is less than the quantity of shares to be burned (block 2824). Again, the user cannot burn shares that the user does not own. If the FT account balance is less than the quantity of shares to be burned (block 2824: Yes), then the process throws an error (block 2803), and operation ends (block 2804).

If the FT account balance is not less than the quantity of shares to be burned (block 2824: No), then the process updates the FT account (block 2825). The process creates a transaction record for the burn (block 2826) and saves the transaction (block 2827). The process determines whether the balance after burning is zero (block 2828). If the balance after burning is zero (block 2828: Yes), then the process updates the NFT token account to remove the user as an owner of the NFT (block 2829). If a user burns all shares of the F-NFT, then the user is no longer the owner of the F-NFT. The count of NFTs in the user's token account is decremented and the ownership composite key is deleted. Thereafter, or if the balance after burning is not zero (block 2828: No), then the process updates the token class (block 2830) and updates the token (block 2831). Thereafter, operation ends (block 2804).

In the use case described above, Tom can burn all the shares of his NFT. FIG. 29 illustrates an update to a user's internal FT account after burning a share of a fractional NFT in accordance with an embodiment. In this example, Tom has burned all his shares of the NFT; therefore, the balance is updated to 0 (zero). FIG. 30 illustrates an update to a user's NFT account after burning all shares of a fractional NFT owned by the user in accordance with an embodiment. In this example, because Tom no longer owns the fractional NFT, the number of NFTs owned by Tom decreased from 1 to 0. FIG. 31 illustrates an update to a fractional NFT after burning shares of the fractional NFT in accordance with an embodiment. Because Tom burned two shares, the quantity of shares of the fractional NFT decreased from 7 to 5.

Account Transaction History

The data model described above is useful for generating the transaction and account history of any users. Using the APIs provided by App Builder, one can fetch all the necessary data. FIG. 32 illustrates an example report of an account transaction history in accordance with an embodiment.

Exchange

Figure 33:
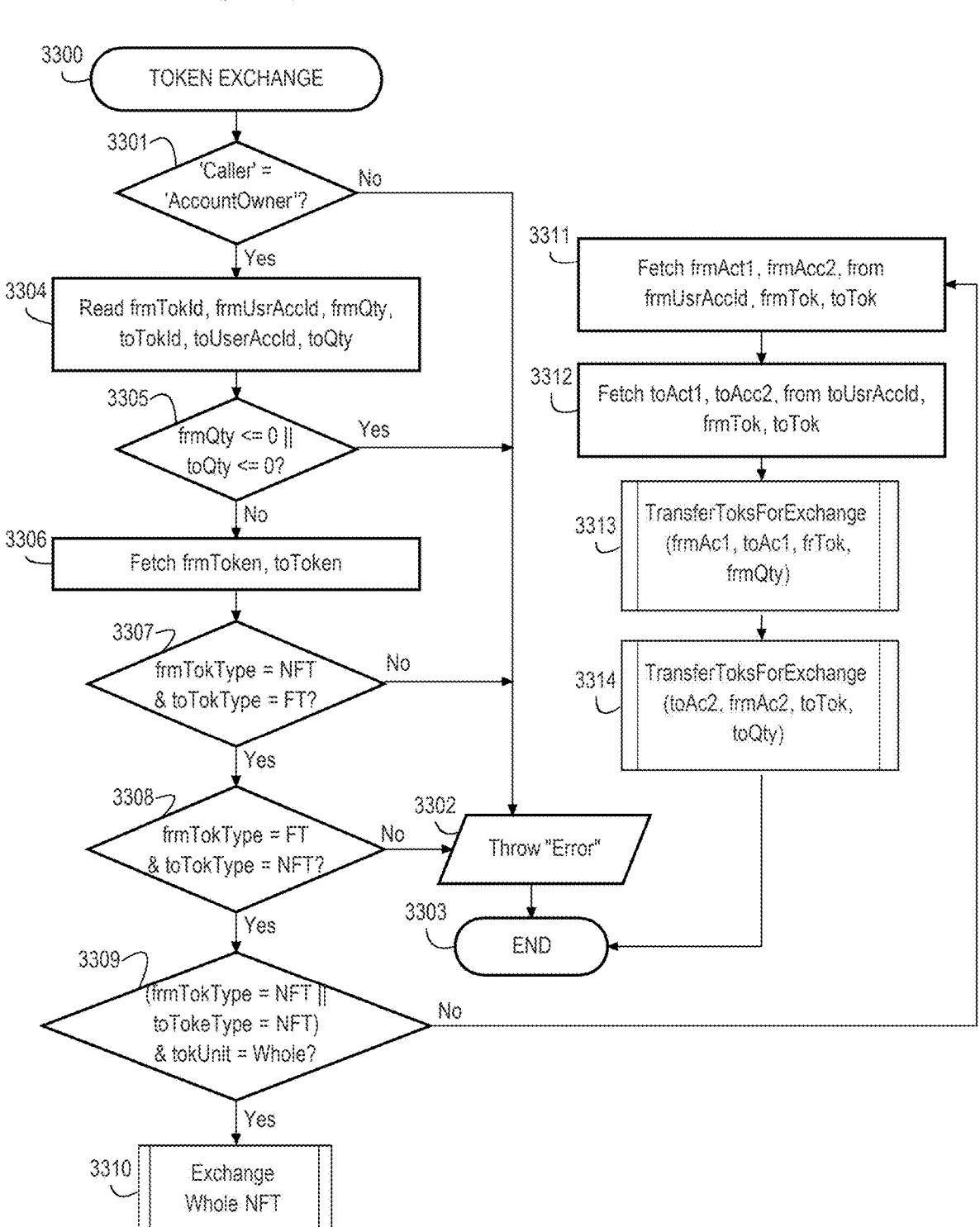
FIG. 33 is a flowchart illustrating operation of a process flow for token exchange in accordance with an embodiment.

The 'exchangeToken' API can be used to exchange tokens between two users. For instance, one user can exchange FTs owned by him with NFT/F-NFT owned by another user. FIG. 33 is a flowchart illustrating operation of a process flow for token exchange in accordance with an embodiment. Operation begins when a user initiates an exchange of one token for another token (block 3300). The process determines whether the caller is the account owner (block 3301). If the caller is not the account owner (block 3301: No), then the process throws an error (block 3302), and operation ends (block 3303).

If the caller is the account owner (block 3301: Yes), then the process reads the "from" token ID, the "from" user account ID, the "from" quantity, the "to" token ID, the "to" user account ID, and the "to" quantity (block 3304). The "from" user is transferring a quantity (the "from" quantity) of a first token (the "from" token ID) in exchange for the "to" user transferring a quantity (the "to" quantity) of a second token (the "to" token ID). The process determines whether the "from" quantity is less than or equal to zero or the "to" quantity is less than or equal to zero (block 3305). If the "from" quantity is less than or equal to zero or the "to" quantity is less than or equal to zero (block 3305: Yes), then the process throws an error (block 3302), and operation ends (block 3303).

If the "from" quantity is not less than or equal to zero or the "to" quantity is less than or equal to zero (block 3305: No), then the process fetches the "from" token and the "to" token (block 3306). The process determines whether the "from" token type is NFT and the "to" token type is FT (block 3307). This determination has a positive result if both the "from" token is type NFT and the "to" token is type FT, i.e., an NFT is being exchanged for an FT. If the determination of whether "from" token type is NFT and the "to" token type is FT is negative (block 3307: No), then the process throws an error (block 3302), and operation ends (block 3303).

If the determination of whether "from" token type is NFT and the "to" token type is FT is positive (block 3307: Yes), then the process determines whether the "from" token type is FT and the "to" token type is NFT (block 3308). This determination has a positive result if both the "from" token is type FT and the "to" token is type, i.e., an FT is being exchanged for an NFT. If the determination of whether the "from" token type is FT and the "to" token type is NFT is negative (block 3308: No), then the process throws an error (block 3302), and operation ends (block 3303).

If the determination of whether the "from" token type is FT and the "to" token type is NFT is positive (block 3308: Yes), then the process determines whether the "from" token type is NFT or the "to" token type is NFT, and the "to" token unit is 'whole' (block 3309). This determination has a positive result if an NFT is being exchanged for an NFT and the "to" token unit is 'whole," i.e., a whole NFT is being exchanged for a whole NFT. If the determination whether the "from" token type is NFT or the "to" token type is NFT, and the "to" token unit is 'whole,' is positive (block 3309: Yes), then the process performs a process to exchange whole NFTs (block 3310).

If the determination whether the "from" token type is NFT or the "to" token type is NFT, and the "to" token unit is 'whole,' is negative (i.e., an FT is being exchanged for a share of an NFT or a share of an NFT is being exchanged for an FT) (block 3309: No), then the process fetches "from" account 1 and "from" account 2 from the "from" user account ID, the "from" token, and the "to" token (block 3311). The "from" account 1 corresponds to the token type of the "from" token and the "from" account 2 corresponds to the token type of the "to" token. The process fetches "to" account 1 and "to" account 2 from the "to" user account ID, the "from" token, and the "to" token (block 3312). The "to" account 1 corresponds to the token type of the "from" token and the "to" account 2 corresponds to the token type of the "to" token.

The process performs a process for transferring tokens for exchange, passing the "from" account 1, the "to" account 1, the "from" token, and the "from" quantity as parameters (block 3313). The process performs a process for transferring tokens for exchange, passing the "to" account 2, the "from" account 2, the "to" token, and the "to" quantity as parameters (block 3314). Thereafter, operation ends. The process for transferring tokens for exchange used in blocks 3313 and 3314 is described in further detail below with reference to FIGS. 34A and 34B.

Figure 34A:
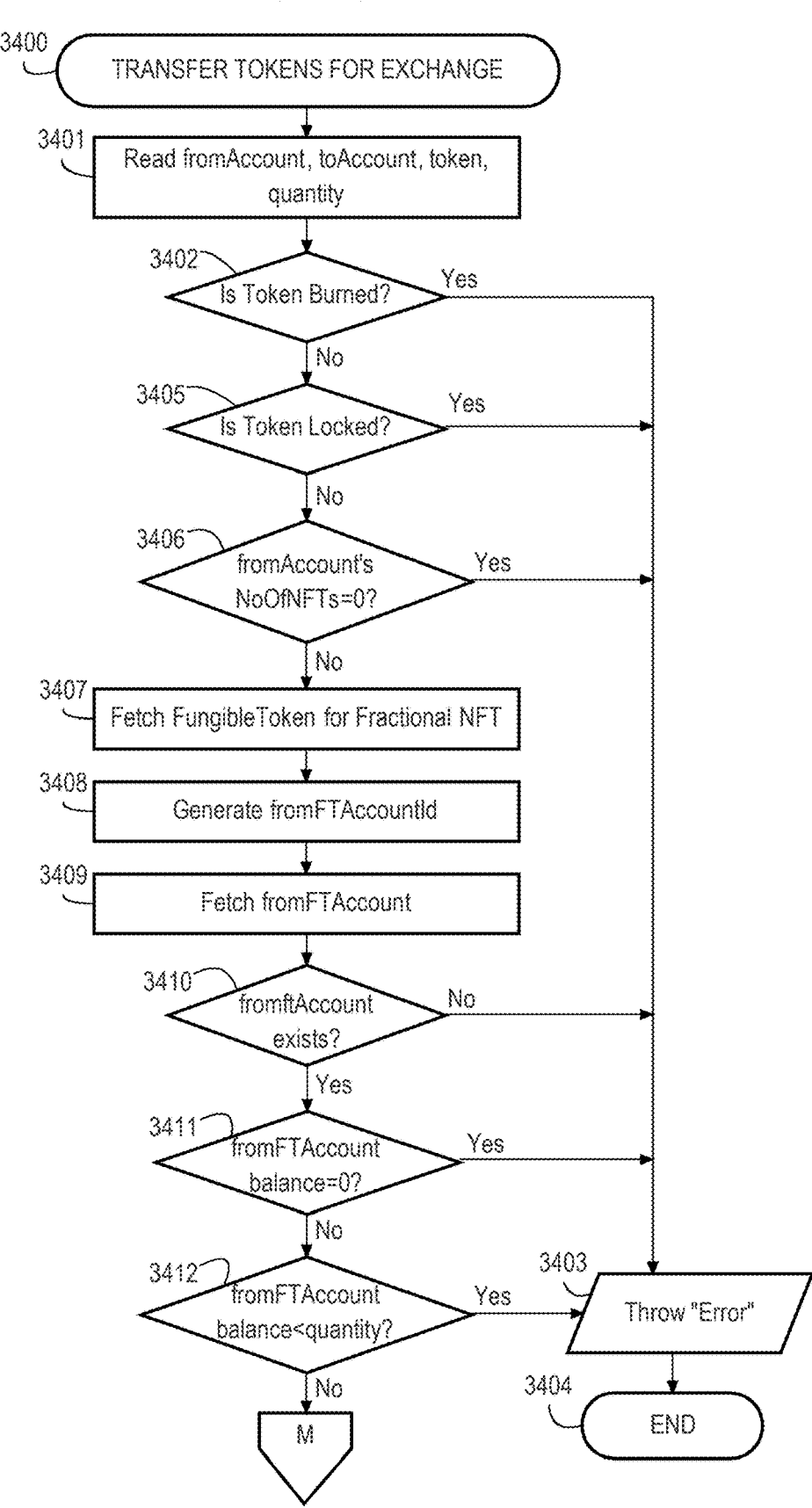

FIGS. 34A and 34B are continuous portions of a process flow for transferring tokens for exchange in accordance with an embodiment. With reference to FIG. 34A, operation begins when a token is to be exchanged between a "from" account and a "to" account (e.g., as in blocks 3313 and 3314 above) (block 3400). The process reads the "from" account, the "to" account, the token, and the quantity (block 3401). For instance, in block 3313 of FIG. 33, the "from" account is the "from" account 1, the "to" account is the "to" account 1, the token is the "from" token, and the quantity is the "from" quantity. In block 3314 of FIG. 33, the "from" account is the "to" account 2, the "to" account is the "from" account 2, the token is the "to" token, and the quantity is the "to" quantity.

The process determines whether the token is burned (block 3402). If the token is burned (block 3402: Yes), then the process throws an error (block 3403), and operation ends (block 3404). If the token is not burned (block 3402: No), then the process determines whether the token is locked (block 3405). If the token is locked (block 3405: Yes), then the process throws an error (block 3403), and operation ends (block 3404). If the token is not locked (block 3405: No), then the process determines whether the "from" account's number of NFTs is zero (block 3406). If the "from" accounts" number of NFTs is zero (block 3406: Yes), then the process throws an error (block 3403), and operation ends (block 3404).

If the "from" account's number of NFTs is not zero (block 3406: No), then the process fetches the fungible token for the fractional NFT (block 3407). The process generates the "from" FT account ID (block 3408) and fetches the "from" FT account (block 3409). The process then determines whether the "from" FT account exists (block 3410). If the "from" FT account does not exist (block 3410: No), then the process throws an error (block 3403), and operation ends (block 3404).

If the "from" account exists (block 3410), then the process determines whether the "from" FT account balance is zero (block 3411). If the "from" FT account balance is zero (block 3411: Yes), then the process throws an error (block 3403), and operation ends (block 3404). If the "from" FT account balance is not zero (block 3411: No), then the process determines whether the "from" FT account balance is less than the quantity (block 3412). If the "from" FT account balance is less than the quantity (block 3412: Yes), then the process throws an error (block 3403), and operation ends (block 3404).

If the "from" FT account balance is not less than the quantity (block 3412: No), then operation proceeds to FIG. 34B. The process updates the "from" FT account balance to subtract the quantity from the "from" FT account balance (block 3413). The process generates the "to" FT account ID (block 3414) and fetches the "to" FT account (block 3415). The process determines whether the "to" FT account balance is zero (block 3416). If the "to" FT account balance is zero (block 3416: Yes), then the process adds the "to" account to the fractional NFT owners (block 3417). Thereafter, or if the "to" FT account balance is not zero (block 3416: No), the process updates the "to" FT account balance (block 3418). The process creates a transaction record for the transfer (block 3419) and saves the transaction (block 3420). The process then updates the "from" account (block 3421) and updates the "to" account (block 3422). Thereafter, operation ends (block 3423).

Other API

There are many other APIs provided to the user, which can be used to fetch comprehensive data of all the tokens, the current state, history, users, and owners in the system.

MVCC Optimization

In accordance with an embodiment, some databases, and ledgers, such as Hypderledger, use multi-version concurrency control (MVCC) to avoid double-spending and data inconsistency. When the same state is updated, a new version of the record overwrites the old version. If there are concurrent requests to update the same key in a block, an MVCC_READ_CONFLICT error might be generated. To reduce MVCC errors, a user can enable the MVCC optimization for token chaincode. This optimization works on Oracle Blockchain Platform only. Using this optimization allows the application to support high transaction throughputs.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 35:
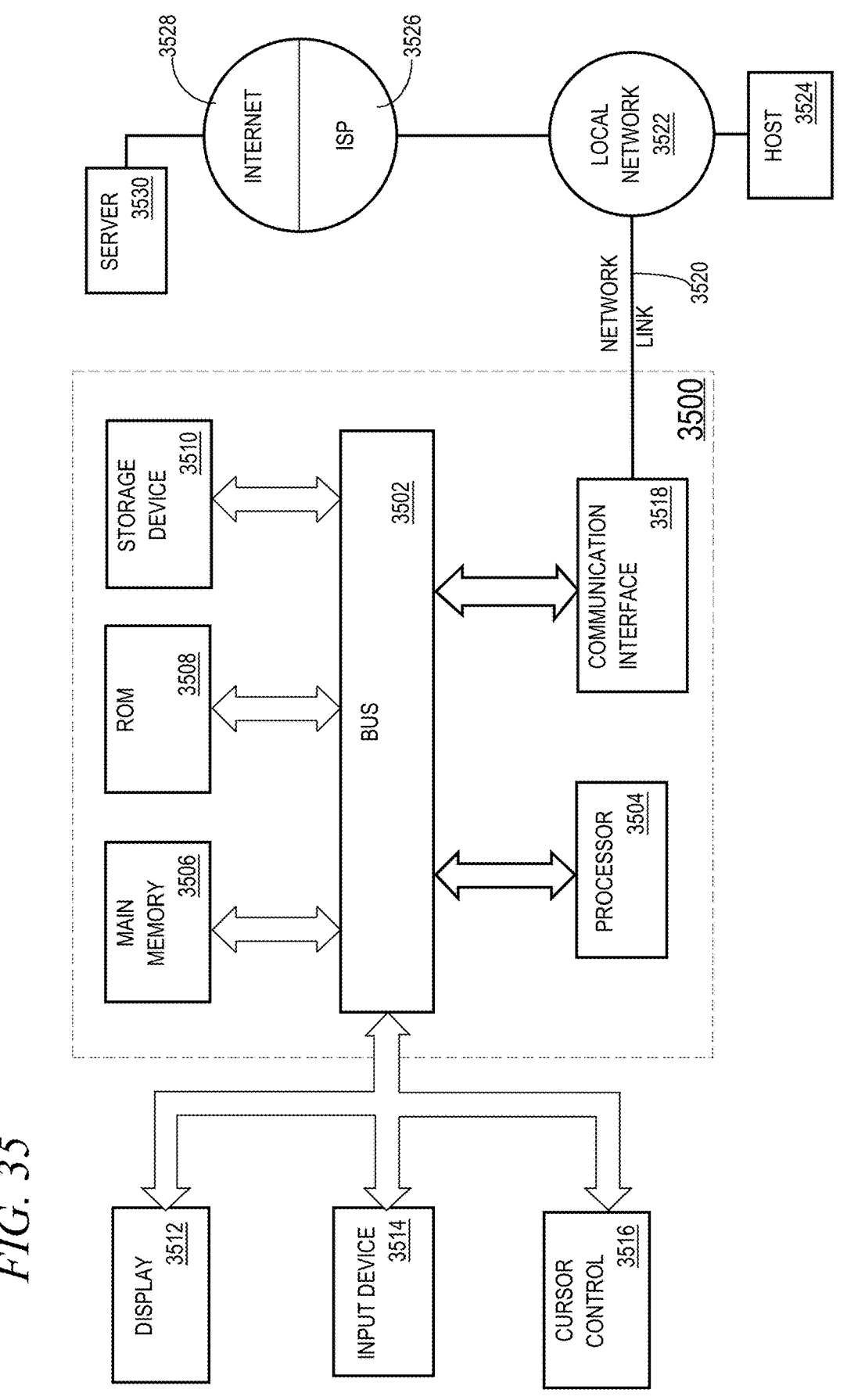
FIG. 35 is a block diagram that illustrates a computer system upon which aspects of the embodiments may be implemented.

For example, FIG. 35 is a block diagram that illustrates a computer system 3500 upon which aspects of the embodiments may be implemented. Computer system 3500 includes a bus 3502 or other communication mechanism for communicating information, and a hardware processor 3504 coupled with bus 3502 for processing information. Hardware processor 3504 may be, for example, a general-purpose microprocessor.

Computer system 3500 also includes a main memory 3506, such as a random-access memory (RAM) or other dynamic storage device, coupled to bus 3502 for storing information and instructions to be executed by processor 3504. Main memory 3506 also may be used for storing temporary variables or other intermediate information during execution of instructions to be executed by processor 3504. Such instructions, when stored in non-transitory storage media accessible to processor 3504, render computer system 3500 into a special-purpose machine that is customized to perform the operations specified in the instructions.

Computer system 3500 further includes a read only memory (ROM) 3508 or other static storage device coupled to bus 3502 for storing static information and instructions for processor 3504. A storage device 3510, such as a magnetic disk, optical disk, or solid-state drive is provided and coupled to bus 3502 for storing information and instructions.

Computer system 3500 may be coupled via bus 3502 to a display 3512, such as a cathode ray tube (CRT), for displaying information to a computer user. An input device 3514, including alphanumeric and other keys, is coupled to bus 3502 for communicating information and command selections to processor 3504. Another type of user input device is cursor control 3516, such as a mouse, a trackball, or cursor direction keys for communicating direction information and command selections to processor 3504 and for controlling cursor movement on display 3512. This input device typically has two degrees of freedom in two axes, a first axis (e.g., x) and a second axis (e.g., y), that allows the device to specify positions in a plane.

Computer system 3500 may implement the techniques described herein using customized hard-wired logic, one or more ASICs or FPGAs, firmware and/or program logic which in combination with the computer system causes or programs computer system 3500 to be a special-purpose machine. According to one embodiment, the techniques herein are performed by computer system 3500 in response to processor 3504 executing one or more sequences of one or more instructions contained in main memory 3506. Such instructions may be read into main memory 3506 from another storage medium, such as storage device 3510. Execution of the sequences of instructions contained in main memory 3506 causes processor 3504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 3510. Volatile media includes dynamic memory, such as main memory 3506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 3502. Transmission media can also take the form of acoustic or light waves, such as those generated during radio-wave and infra-red data communications.

Various forms of media may be involved in carrying one or more sequences of one or more instructions to processor 3504 for execution. For example, the instructions may initially be carried on a magnetic disk or solid-state drive of a remote computer. The remote computer can load the instructions into its dynamic memory and send the instructions over a telephone line using a modem. A modem local to computer system 3500 can receive the data on the telephone line and use an infra-red transmitter to convert the data to an infra-red signal. An infra-red detector can receive the data carried in the infra-red signal and appropriate circuitry can place the data on bus 3502. Bus 3502 carries the data to main memory 3506, from which processor 3504 retrieves and executes the instructions. The instructions received by main memory 3506 may optionally be stored on storage device 3510 either before or after execution by processor 3504.

Computer system 3500 also includes a communication interface 3518 coupled to bus 3502. Communication interface 3518 provides a two-way data communication coupling to a network link 3520 that is connected to a local network 3522. For example, communication interface 3518 may be an integrated services digital network (ISDN) card, cable modem, satellite modem, or a modem to provide a data communication connection to a corresponding type of telephone line. As another example, communication interface 3518 may be a local area network (LAN) card to provide a data communication connection to a compatible LAN. Wireless links may also be implemented. In any such implementation, communication interface 3518 sends and receives electrical, electromagnetic, or optical signals that carry digital data streams representing various types of information.

Network link 3520 typically provides data communication through one or more networks to other data devices. For example, network link 3520 may provide a connection through local network 3522 to a host computer 3524 or to data equipment operated by an Internet Service Provider (ISP) 3526. ISP 3526 in turn provides data communication services through the world-wide packet data communication network now commonly referred to as the "Internet" 3528. Local network 3522 and Internet 3528 both use electrical, electromagnetic, or optical signals that carry digital data streams. The signals through the various networks and the signals on network link 3520 and through communication interface 3518, which carry the digital data to and from computer system 3500, are example forms of transmission media.

Computer system 3500 can send messages and receive data, including program code, through the network(s), network link 3520 and communication interface 3518. In the Internet example, a server 3530 might transmit a requested code for an application program through Internet 3528, ISP 3526, local network 3522 and communication interface 3518.

The received code may be executed by processor 3504 as it is received, and/or stored in storage device 3510, or other non-volatile storage for later execution.

Software Overview

Figure 36:
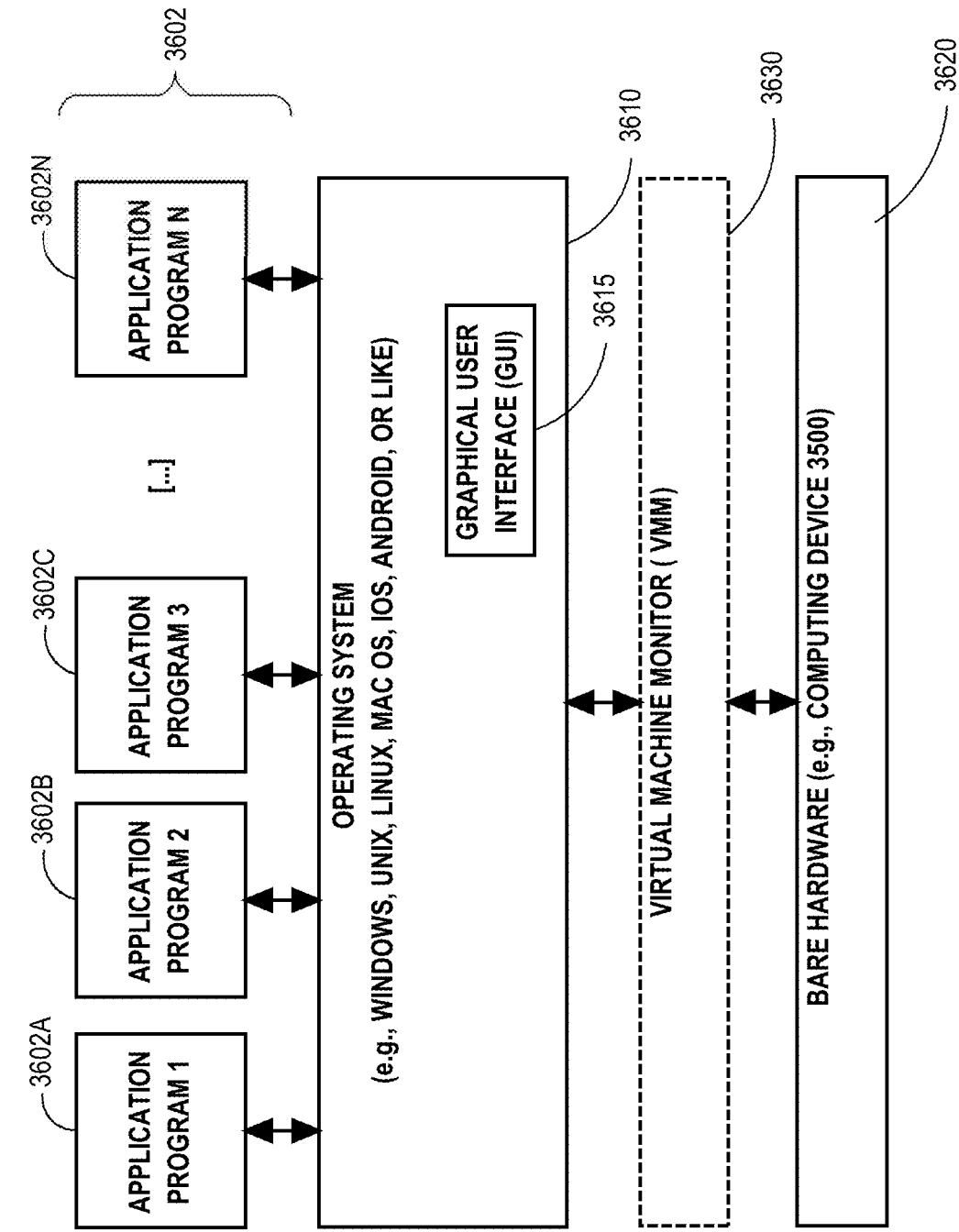
FIG. 36 is a block diagram of a basic software system that may be employed for controlling operation of a computer system upon which aspects of the embodiments may be implemented.

FIG. 36 is a block diagram of a basic software system 3600 that may be employed for controlling the operation of computer system 3500. Software system 3600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 3600 is provided for directing the operation of computer system 3500. Software system 3600, which may be stored in system memory (RAM) 3506 and on fixed storage (e.g., hard disk or flash memory) 3510, includes a kernel or operating system (OS) 3610.

The OS 3610 manages low-level aspects of computer operation, including managing execution of processes, memory allocation, file input and output (I/O), and device I/O. One or more application programs, represented as 3602A, 3602B, 3602C . . . 3602N, may be "loaded" (e.g., transferred from fixed storage 3510 into memory 3506) for execution by system 3600. The applications or other software intended for use on computer system 3500 may also be stored as a set of downloadable computer-executable instructions, for example, for downloading and installation from an Internet location (e.g., a Web server, an app store, or other online service).

Software system 3600 includes a graphical user interface (GUI) 3615, for receiving user commands and data in a graphical (e.g., "point-and-click" or "touch gesture") fashion. These inputs, in turn, may be acted upon by system 3600 in accordance with instructions from operating system 3610 and/or application(s) 3602. The GUI 3615 also serves to display the results of operation from the OS 3610 and application(s) 3602, whereupon the user may supply additional inputs or terminate the session (e.g., log off).

OS 3610 can execute directly on the bare hardware 3620 (e.g., processor(s) 3504) of computer system 3500. Alternatively, a hypervisor or virtual machine monitor (VMM) 3630 may be interposed between the bare hardware 3620 and the OS 3610. In this configuration, VMM 3630 acts as a software "cushion" or virtualization layer between the OS 3610 and the bare hardware 3620 of the computer system 3500.

VMM 3630 instantiates and runs one or more virtual machine instances ("guest machines"). Each guest machine comprises a "guest" operating system, such as OS 3610, and one or more applications, such as application(s) 3602, designed to execute on the guest operating system. The VMM 3630 presents the guest operating systems with a virtual operating platform and manages the execution of the guest operating systems.

In some instances, the VMM 3630 may allow a guest operating system to run as if it is running on the bare hardware 3620 of computer system 3500 directly. In these instances, the same version of the guest operating system configured to execute on the bare hardware 3620 directly may also execute on VMM 3630 without modification or reconfiguration. In other words, VMM 3630 may provide full hardware and CPU virtualization to a guest operating system in some instances.

In other instances, a guest operating system may be specially designed or configured to execute on VMM 3630 for efficiency. In these instances, the guest operating system is "aware" that it executes on a virtual machine monitor. In other words, VMM 3630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
automatically generating a fractional non-fungible token (NFT) application for managing a particular fractional NFT representing ownership of an asset in a blockchain platform based on a specification data structure, wherein:
the blockchain platform operates as a distributed ledger,
the specification data structure specifies a set of token properties and a set of token behaviors of the particular fractional NFT,
a first user has a token minter role for the particular fractional NFT,
a first user account is associated with the first user in the blockchain platform, and
the first user account is associated with a first NFT account,
deploying the fractional NFT application in the blockchain platform to manage a lifecycle of the particular fractional NFT in the distributed ledger;
in response to the first user initiating minting of the particular fractional NFT, the fractional NFT application performing:
creating the particular fractional NFT;
creating a first internal fungible token account associated with the first user for a fungible NFT representing ownership of shares of the particular fractional NFT;
updating the first NFT account to increase a first NFT balance value representing a number of NFTs owned by the first user; and
updating the first internal fungible token account to set a first share balance value representing a number of shares of the particular fractional NFT that are owned by the first user,
wherein the method is performed by one or more computing devices.

2. The method of claim 1, further comprising:
in response to the first user initiating a transaction to transfer a given number of shares of the particular fractional NFT to a second user, the fractional NFT application performing:
updating the first internal fungible token account to decrease the first share balance value representing the number of shares of the particular fractional NFT owned by the first user;
updating a second internal fungible token account associated with the second user to increase a second share balance value representing the number of shares of the particular fractional NFT owned by the second user;
updating a second NFT account associated with the second user to increase a second NFT balance value representing a number of NFTs owned by the second user;
updating the particular fractional NFT to indicate the second user is an owner of the particular fractional NFT; and
creating a transaction record corresponding to transferring the given number of shares of the particular fractional NFT from the first user to the second user and saving the transaction record in the distributed ledger.

3. The method of claim 1, further comprising:
in response to a given user of the blockchain platform initiating burning a share of the particular fractional NFT, wherein the given user owns at least one share of the particular fractional NFT, the fractional NFT application performing:
updating an internal fungible token account associated with the given user to decrement a third share balance value representing a number of shares of the particular fractional NFT owned by the given user;
updating the particular fractional NFT to decrement a quantity property; and
creating a transaction record corresponding to burning the share of the particular fractional NFT and saving the transaction record in the distributed ledger.

4. The method of claim 3, further comprising:
in response to the third share balance value in the internal fungible token account associated with the given user being equal to zero:
updating a third NFT account associated with the given user to decrease a third NFT balance value representing a number of NFTs owned by the given user; and
updating the particular fractional NFT to indicate the particular fractional NFT is not owned by the given user.

5. The method of claim 3, wherein the set of token behaviors includes a burnable behavior.

6. The method of claim 3, wherein the given user has a burner role for the particular fractional NFT.

7. The method of claim 1, wherein the particular fractional NFT has a quantity property value representing a number of shares of the particular fractional NFT, the method further comprising:
in response to the first user initiating re-minting of the particular fractional NFT based on an updated quantity property value, the fractional NFT application performing:
updating the first internal fungible token account to increase the first share balance value representing the number of shares of the particular fractional NFT owned by the first user;

updating the quantity property value of the particular fractional NFT to the updated quantity property value; and creating a transaction record corresponding to re-minting the particular fractional NFT and saving the transaction record in the distributed ledger.

8. The method of claim 1, wherein a token identifier of the fungible NFT comprises a concatenation of a token identifier of the particular fractional NFT and a suffix.

9. The method of claim 1, wherein the fractional NFT application has a unified flow for creation of fungible tokens, whole non-fungible tokens, and fractional non-fungible tokens.

10. The method of claim 1, wherein:

the first user account specifies the first NFT account and one or more fungible token (FT) accounts, each FT account holds one or more fungible tokens of a particular type, and the NFT account holds one or more non-fungible tokens including the particular fractional NFT.

11. One or more non-transitory storage media storing instructions which, when executed by one or more computing devices, cause performance of:

automatically generating a fractional non-fungible token (NFT) application for managing a particular fractional NFT representing ownership of an asset in a blockchain platform based on a specification data structure, wherein:

the blockchain platform operates as a distributed ledger, the specification data structure specifies a set of token properties and a set of token behaviors of the particular fractional NFT, a first user has a token minter role for the particular fractional NFT, a first user account is associated with the first user in the blockchain platform, and the first user account is associated with a first NFT account, deploying the fractional NFT application in the blockchain platform to manage a lifecycle of the particular fractional NFT in the distributed ledger;

in response to the first user initiating minting of the particular fractional NFT, the fractional NFT application performing:

creating the particular fractional NFT;

creating a first internal fungible token account associated with the first user for a fungible NFT representing ownership of shares of the particular fractional NFT;

updating the first NFT account to increase a first NFT balance value representing a number of NFTs owned by the first user; and updating the first internal fungible token account to set a first share balance value representing a number of shares of the particular fractional NFT that are owned by the first user.

12. The one or more non-transitory storage media of claim 11, wherein the instructions, when executed by one or more computing devices, further cause performance of:

in response to the first user initiating a transaction to transfer a given number of shares of the particular fractional NFT to a second user, the fractional NFT application performing:

updating the first internal fungible token account to decrease the first share balance value representing the number of shares of the particular NFT owned by the first user;

updating a second internal fungible token account associated with the second user to increase a second share balance value representing the number of shares of the particular fractional NFT owned by the second user;

updating a second NFT account associated with the second user to increase a second NFT balance value representing a number of NFTs owned by the second user;

updating the particular fractional NFT to indicate the second user is an owner of the particular fractional NFT; and creating a transaction record corresponding to transferring the given number of shares of the particular fractional NFT from the first user to the second user and saving the transaction record in the distributed ledger.

13. The one or more non-transitory storage media of claim 11, wherein the instructions, when executed by one or more computing devices, further cause performance of:

in response to a given user of the blockchain platform initiating burning a share of the particular fractional NFT, wherein the given user owns at least one share of the particular fractional NFT, the fractional NFT application performing:

updating an internal fungible token account associated with the given user to decrement a third share balance value representing a number of shares of the particular fractional NFT owned by the given user;

updating the particular fractional NFT to decrement a quantity property; and creating a transaction record corresponding to burning the share of the particular fractional NFT and saving the transaction record in the distributed ledger.

14. The one or more non-transitory storage media of claim 13, wherein the instructions, when executed by one or more computing devices, further cause performance of:

in response to the third share balance value in the internal fungible token account associated with the given user being equal to zero:

updating a third NFT account associated with the given user to decrease a third NFT balance value representing a number of NFTs owned by the given user; and updating the particular fractional NFT to indicate the particular fractional NFT is not owned by the given user.

15. The one or more non-transitory storage media of claim 13, wherein the set of token behaviors includes a burnable behavior.

16. The one or more non-transitory storage media of claim 13, wherein the given user has a burner role for the particular fractional NFT.

17. The one or more non-transitory storage media of claim 11, wherein the particular fractional NFT has a quantity property value representing a number of shares of the particular fractional NFT, wherein the instructions, when executed by one or more computing devices, further cause performance of:

in response to the first user initiating re-minting of the particular fractional NFT based on an updated quantity property value, the fractional NFT application performing:

updating the first internal fungible token account to increase the first share balance value representing the number of shares of the particular fractional NFT owned by the first user;

updating the quantity property value of the particular fractional NFT to the updated quantity property value; and creating a transaction record corresponding to re-minting the particular fractional NFT and saving the transaction record in the distributed ledger.

18. The one or more non-transitory storage media of claim 11, wherein a token identifier of the fungible NFT comprises a concatenation of a token identifier of the particular fractional NFT and a suffix.

19. The one or more non-transitory storage media of claim 11, wherein the fractional NFT application has a unified flow for creation of fungible tokens, whole non-fungible tokens, and fractional non-fungible tokens.

20. The one or more non-transitory storage media of claim 11, wherein:

the first user account specifies the first NFT account and one or more fungible token accounts, each FT account holds one or more fungible tokens of a particular type, and the NFT account holds one or more non-fungible tokens including the particular fractional NFT.

* * * * *